United States Patent
Hong

(10) Patent No.: US 10,511,348 B2
(45) Date of Patent: Dec. 17, 2019

(54) ELECTRONIC DEVICE AND METHOD FOR SHORT RANGE WIRELESS COMMUNICATION IN THE ELECTRONIC DEVICE

(71) Applicant: Samsung Electronics Co., Ltd., Suwon-si, Gyeonggi-do (KR)

(72) Inventor: Seung-Su Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/036,429

(22) Filed: Jul. 16, 2018

(65) Prior Publication Data

US 2018/0331725 A1 Nov. 15, 2018

Related U.S. Application Data

(63) Continuation of application No. 15/411,908, filed on Jan. 20, 2017, now Pat. No. 10,027,380.

(30) Foreign Application Priority Data

Jan. 21, 2016 (KR) ........................ 10-2016-0007716

(51) Int. Cl.
*H04B 5/00* (2006.01)
*H04B 1/3888* (2015.01)
(Continued)

(52) U.S. Cl.
CPC ......... *H04B 5/0075* (2013.01); *H04B 1/3888* (2013.01); *H04B 5/0031* (2013.01);
(Continued)

(58) Field of Classification Search
CPC ................................ G06F 1/1677; H04B 5/00
See application file for complete search history.

(56) References Cited

U.S. PATENT DOCUMENTS 8,631,328 B2   1/2014  Kim et al.
8,793,519 B2 *  7/2014  Hong .................... G06F 1/1626
                                                          323/318
(Continued)

FOREIGN PATENT DOCUMENTS

KR        101270334 B1    5/2013
KR      20130079064 A     7/2013
(Continued)

OTHER PUBLICATIONS

Foreign Communication from Related Counterpart Application, European Patent Application No. 17152476.2, European Search Report and Written Opinion dated Apr. 7, 2017, 11 pages.
(Continued)

*Primary Examiner* — Cindy Trandai

(57) ABSTRACT

Disclosed are an electronic device and a method of short range wireless communication in an electronic device. The method of operating the electronic device may include: when a cover is connected to the electronic device through a short range wireless communication connection, determining generation of an event related to the cover. The method further comprises, when the event is generated, supplying power to the cover through wireless communication, when the cover is driven by the supplied power, transmitting event information to the cover through the short range wireless communication connection to display the information related to the generated event on the cover, and, when an operation of the cover according to the event is completed, switching to a standby mode after releasing the short range wireless communication connection with the cover.

15 Claims, 20 Drawing Sheets

(51) Int. Cl.
*H04M 1/725* (2006.01)
*H04W 12/06* (2009.01)

(52) U.S. Cl.
CPC ........ *H04B 5/0037* (2013.01); *H04M 1/7253* (2013.01); *H04W 12/06* (2013.01)

(56) References Cited

U.S. PATENT DOCUMENTS

| | | | |
|---|---|---|---|
| 8,849,195 B2 | 9/2014 | Drihara et al. | |
| 8,995,914 B2 | 3/2015 | Nishidai | |
| 9,369,184 B2* | 6/2016 | Nambord | G06F 1/1632 |
| 9,559,548 B2* | 1/2017 | Kwon | H02J 5/005 |
| 2004/0116074 A1* | 6/2004 | Fujii | G06K 7/0008 |
| | | | 455/41.2 |
| 2008/0232506 A1* | 9/2008 | Fujita | G01S 13/931 |
| | | | 375/295 |
| 2009/0122772 A1 | 5/2009 | Jung | |
| 2009/0212637 A1* | 8/2009 | Baarman | H01F 7/0247 |
| | | | 307/104 |
| 2011/0279244 A1 | 11/2011 | Park et al. | |
| 2012/0202435 A1 | 8/2012 | Kim et al. | |
| 2012/0276953 A1* | 11/2012 | Kim | H04M 1/72527 |
| | | | 455/556.1 |
| 2013/0076298 A1 | 3/2013 | Miller et al. | |
| 2013/0076653 A1* | 3/2013 | Selim | G06F 3/1438 |
| | | | 345/173 |
| 2013/0094598 A1* | 4/2013 | Bastami | H02J 5/005 |
| | | | 375/259 |
| 2013/0176653 A1 | 7/2013 | Kim et al. | |
| 2013/0205142 A1* | 8/2013 | Jung | G06F 1/1677 |
| | | | 713/300 |
| 2013/0231049 A1 | 9/2013 | Sharma et al. | |
| 2013/0252676 A1* | 9/2013 | Lee | H04B 5/0037 |
| | | | 455/573 |
| 2013/0270920 A1 | 10/2013 | Yoon et al. | |
| 2014/0049886 A1* | 2/2014 | Lee | H02J 4/00 |
| | | | 361/679.01 |
| 2014/0120832 A1 | 5/2014 | Confer et al. | |
| 2014/0152119 A1* | 6/2014 | Endo | H02J 50/50 |
| | | | 307/104 |
| 2014/0191568 A1 | 7/2014 | Partovi | |
| 2014/0274215 A1* | 9/2014 | Del Toro | G06F 1/1628 |
| | | | 455/566 |
| 2015/0087228 A1 | 3/2015 | Porat et al. | |
| 2015/0115725 A1* | 4/2015 | Kang | H01F 38/14 |
| | | | 307/104 |
| 2015/0118965 A1 | 4/2015 | Butler | |
| 2015/0155903 A1* | 6/2015 | Jang | H04B 1/3888 |
| | | | 455/575.8 |
| 2015/0180525 A1 | 6/2015 | Chen | |
| 2015/0207913 A1 | 7/2015 | Nakano et al. | |
| 2015/0245384 A1 | 8/2015 | Nambord et al. | |
| 2015/0280790 A1* | 10/2015 | Onizuka | H02J 17/00 |
| | | | 320/108 |
| 2015/0288421 A1 | 10/2015 | Nambord et al. | |
| 2015/0362955 A1* | 12/2015 | Hayashi | G06F 1/1677 |
| | | | 360/6 |
| 2015/0364944 A1* | 12/2015 | Garcia Briz | H02J 5/005 |
| | | | 307/104 |
| 2016/0141899 A1* | 5/2016 | Oo | H02J 7/0044 |
| | | | 320/108 |
| 2016/0149597 A1* | 5/2016 | Takasu | G06F 1/1669 |
| | | | 455/127.2 |
| 2016/0233711 A1 | 8/2016 | Miller et al. | |
| 2016/0241087 A1* | 8/2016 | Bae | H02J 50/12 |
| 2016/0247144 A1 | 8/2016 | Oh et al. | |
| 2016/0301785 A1 | 10/2016 | Espinoza et al. | |
| 2017/0126267 A1 | 5/2017 | Park et al. | |
| 2017/0228038 A1 | 8/2017 | Tangen et al. | |
| 2017/0295456 A1 | 10/2017 | Tanabe et al. | |
| 2018/0183267 A1* | 6/2018 | Lin | H02J 50/12 |
| 2018/0323828 A1* | 11/2018 | Hwang | H02J 50/12 |

FOREIGN PATENT DOCUMENTS

| | | |
|---|---|---|
| KR | 20140008487 A | 1/2014 |
| KR | 20140089753 A | 7/2014 |
| KR | 20140104081 A | 8/2014 |
| KR | 101453024 B1 | 10/2014 |
| KR | 20150009409 A | 1/2015 |
| KR | 101494760 B1 | 2/2015 |

OTHER PUBLICATIONS

Foreign Communication from Related Counterpart Application, PCT Patent Application No. PCT/KR2017/000680, International Search Report and Written Opinion dated Apr. 24, 2017, 9 pages.

* cited by examiner

| Comment | ADDR | Bit7 | Bit6 | Bit5 | Bit4 | Bit3 | Bit2 | Bit1 | Bit0 |
|---|---|---|---|---|---|---|---|---|---|
| Command_Host | 0001 | Write_done | | Repeat | | | numOfFr | numOfFr | numOfFr |
| Status_FPGA | 0002 | | | | | | TimeOfFr | TimeOfFr | TimeOfFr |
| | 0003 | | | | | | | | |
| Updated date | 0004 | Year | Year | Year | Year | Month | Month | Month | Month |
| Updated date | 0005 | Date | Date | Date | Date | Date | Date | | |
| Updated time | 0006 | AM/PM | Hr | Hr | Hr | Hr | Hr | | |
| Updated minute | 0007 | Min | Min | Min | Min | Min | Min | | |
| | 0008 | | | | | | | | |
| Frame sequence | 0009 | 1st Frame | 1st Frame | 1st Frame | | 2nd Fr | 2nd Fr | 2nd Fr | 2nd Fr |
| Frame sequence | 0010 | 3nd Fr | 3nd Fr | 3nd Fr | | 4nd Fr | 4nd Fr | 4nd Fr | 4nc Fr |
| Frame sequence | 0011 | 5th Fr | 5th Fr | 5th Fr | | 6th Fr | 6th Fr | 6th Fr | 6th Fr |
| Frame sequence | 0012 | 7th Fr | 7th Fr | 7th Fr | | 8th Fr | 8th Fr | 8th Fr | 8th Fr |
| Frame sequence | 0013 | 9th Fr | 9th Fr | 9th Fr | | 10th Fr | 10th Fr | 10th Fr | 10th Fr |
| | 0014 | | | | | | | | |
| | 0015 | | | | | | | | |
| | 0016 | | | | | | | | |
| Frame1, Row1 | 0017 | [1,1] | [1,2] | [1,3] | [1,4] | [1,5] | [1,6] | [1,7] | [1,8] |
| Frame1, Row2 | 0018 | [2,1] | [2,2] | [2,3] | [2,4] | [2,5] | [2,6] | [2,7] | [2,8] |
| Frame1, Row3 | 0019 | [3,1] | [3,2] | [3,3] | [3,4] | [3,5] | [3,6] | [3,7] | [3,8] |
| Frame1, Row4 | 0020 | [4,1] | [4,2] | [4,3] | [4,4] | [4,5] | [4,6] | [4,7] | [4,8] |
| Frame1, Row5 | 0021 | [5,1] | [5,2] | [5,3] | [5,4] | [5,5] | [5,6] | [5,7] | [5,8] |
| Frame1, Row6 | 0022 | [6,1] | [6,2] | [6,3] | [6,4] | [6,5] | [6,6] | [6,7] | [6,8] |
| Frame1, Row7 | 0023 | [7,1] | [7,2] | [7,3] | [7,4] | [7,5] | [7,6] | [7,7] | [7,8] |
| Frame1, Row8 | 0024 | [8,1] | [8,2] | [8,3] | [8,4] | [8,5] | [8,6] | [8,7] | [8,8] |
| Empty | 0014 | 0 | 0 | 0 | 0 | 0 | 0 | 0 | 0 |
| Empty | 0015 | 0 | 0 | 0 | 0 | 0 | 0 | 0 | 0 |
| Empty | 0016 | 0 | 0 | 0 | 0 | 0 | 0 | 0 | 0 |
| Empty | 0081 | 0 | 0 | 0 | 0 | 0 | 0 | 0 | 0 |
| Empty | 0082 | 0 | 0 | 0 | 0 | 0 | 0 | 0 | 0 |
| Empty | 0083 | 0 | 0 | 0 | 0 | 0 | 0 | 0 | 0 |
| Empty | 0084 | 0 | 0 | 0 | 0 | 0 | 0 | 0 | 0 |
| Empty | 0085 | 0 | 0 | 0 | 0 | 0 | 0 | 0 | 0 |

FIG. 16

```
NFC init(event,...){
  ...
  Switch(event){
    ...
    Protocol_TypeA();
    Protocol_TypeB();
    Protocol_TypeF();
    ISO_15693();
    ...
    Protocol_S(); // cover event
    ...
  }
}
```

FIG.18

ELECTRONIC DEVICE AND METHOD FOR SHORT RANGE WIRELESS COMMUNICATION IN THE ELECTRONIC DEVICE

CROSS-REFERENCE TO RELATED APPLICATIONS AND CLAIM OF PRIORITY

The present application is a continuation of U.S. application Ser. No. 15/411,908, filed Jan. 20, 2017, which is related to and claims priority under 35 U.S.C. § 119(a) to Korean Application Serial No. 10-2016-0007716, which was filed in the Korean Intellectual Property Office on Jan. 21, 2016, the entire contents of which are hereby incorporated by reference.

BACKGROUND

1. Field

The present disclosure relates to an electronic device and a method for short range wireless communication in an electronic device.

2. Description of Related Art

Short range wireless communication may be used for many devices and services and may be performed based on a tag technology in which a tag receives wireless power. Accordingly, wireless power of short range wireless communication used for neighboring devices may be charged.

SUMMARY

A short range wireless communication technology has been developed to a technology that may provide various services through the supply of wireless power to neighboring devices and communication with the neighboring devices.

However, in such a short range wireless communication technology, wireless power is charged in a separate neighboring device, the neighboring device is driven by the charged power, and a service is provided through communication with the neighboring device. Further, the neighboring device that performs short range wireless communication with the electronic device may use only the short range wireless communication or may include a separate battery and drive or operate with power supplied from the battery.

In addition, when the electronic device communicates with an external device through short range wireless communication, power for the short range wireless communication is limited and the short range wireless communication supports only one-to-one communication with the tag. Accordingly, in short range wireless communication in a tag type, the electronic device has difficulty in performing another function.

When information provided by an accessory device such as a cover connected to the electronic device is executed, much power is used. However, due to the characteristic of the accessory device connected to the electronic device, the accessory device should be slim and implemented in a simple form, so it is difficult to install a separate battery. In order to resolve the difficulty, the electronic device may provide power to the accessory device through short range wireless communication.

However, when the electronic device communicates with another external device through short range wireless communication in the tag type, the short range communication with the accessory device is blocked and thus the electronic device has difficulty in supplying sufficient power to the accessory device. Further, since the accessory device should wait until the short range communication with the other device is completed, the accessory device has difficulty in smoothly receiving information provided by the electronic device.

To address the above-discussed deficiencies, it is a primary object to provide an electronic device and a method by which an electronic device supplies wireless power to a neighboring device through short range wireless communication and performs the short range wireless communication with the neighboring device.

An electronic device according to one of various embodiments of the present disclosure to solve the aforementioned problems or other problems may include: a communication unit that communicates with a cover connected to the electronic device through short range wireless communication; and a controller, wherein the controller is configured to determine generation of an event related to the cover, supply power to the cover through wireless communication when the event is generated, make a control to transmit event information to the cover through the short range wireless communication to display the event information on the cover when the cover is driven by the supplied power, and switch to a standby mode after releasing a communication connection with the cover when an operation of the cover according to the event is completed.

A method of short range wireless communication in an electronic device according to one of various embodiments of the present disclosure may include: when a cover is connected to the electronic device through a short range wireless communication connection, determining generation of an event related to the cover; when the event is generated, supplying power to the cover through wireless communication; when the cover is driven by the supplied power, transmitting event information to the cover through the short range wireless communication connection to display the event information on the cover; and when an operation of the cover according to the event is completed, switching to a standby mode after releasing the short range wireless communication connection with the cover.

An accessory device according to one of various embodiments may include a housing including a first surface and a second surface facing an opposite side to the first surface; a combination structure connected to the housing and making the second surface attachable to/detachable from one surface of an external electronic device; a display formed on at least a part of the first surface; and a control circuit disposed inside the housing and electrically connected to the display. The control circuit may include a conductive pattern arranged inside the housing near the second surface of the housing, the conductive pattern configured to receive a magnetic flux generated from the one surface of the external electronic device or a transmitted signal, a power storage device configured to at least temporarily store power induced by the magnetic flux, and a memory device configured to temporarily store at least a part of information included in the transmitted signal, and at least a part of the display configured to be activated using at least the part of the information and the power.

According to an electronic device and a method in an electronic device according to various embodiments, power may be supplied to a cover connected to an electronic device through short range wireless communication, and the cover is driven. When the cover is driven, event information may be transmitted to the cover and displayed on the cover. When an operation of the cover is completed, the electronic device may enter a standby mode and recognize another external device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 16 illustrates an example of a memory map according to various embodiments of the present disclosure;

FIG. 18 illustrates an example of a program of an electronic device related to short range wireless communication according to various embodiments of the present disclosure;

DETAILED DESCRIPTION

Figure 1:
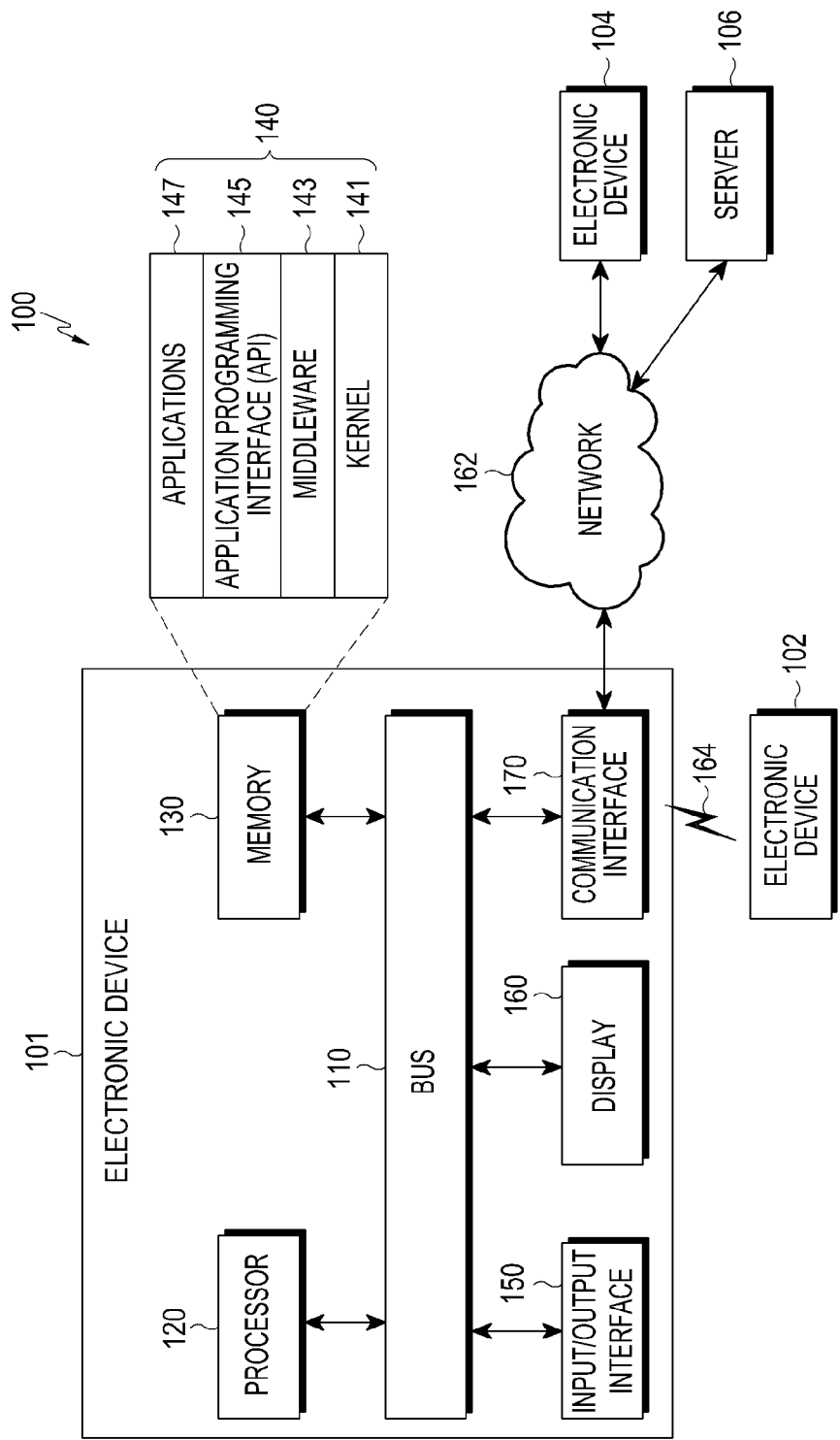
FIG. 1 illustrates a network environment according to various embodiments of the present disclosure.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device or method of operating an electronic device in wireless communication.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the elements, or may further include other elements.

The bus 110 may include, for example, a circuit that interconnects the elements 110 to 170 and delivers communication (for example, a control message and/or data) between the elements 110 to 170.

The processor 120 may include one or more of a Central Processing Unit (CPU), an Application Processor (AP), and a Communication Processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relevant to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (for example, the bus 110, the processor 120, or the memory 130) used for executing an operation or function implemented by other programs (for example, the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities for using the system resources (for example, the bus 110, the processor 120, the memory 130, and the like) of the electronic device 101 to one or more of the application programs 147. For example, the middleware 143 may perform scheduling or loading balancing on the one or more task requests by processing the one or more task requests according to the priorities assigned to the one or more application programs.

The API 145, which is an interface through which the application programs 147 control functions provided from the kernel 141 or the middleware 143, may include, for example, at least one interface or function (for example, an instruction) for file control, window control, image processing, text control, and the like.

The input/output interface 150 may function as, for example, an interface that may forward instructions or data, which is input from a user or another external device, to the other element(s) of the electronic device 101. Furthermore, the input/output interface 150 may output instructions or data, which are received from the other element(s) of the electronic device 101, to the user or the external device.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display. The display 160 may display, for example, various types of contents (for example, text, images, videos, icons, or symbols) to the user. The display 160 may include a touch screen and may receive, for example, a touch, gesture, proximity, or hovering input using an electronic pen or the user's body part.

The communication interface 170 may configure communication, for example, between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), Global System for Mobile Communications (GSM) and the like, for example, as a cellular communication protocol. In addition, the wireless communication may include, for example, short range communication 164. The short range communication 164 may include at least one of, for example, Wi-Fi, Bluetooth™, Near Field Communication (NFC), Magnetic Stripe Transmission (MST), and Global Navigation Satellite System (GNSS). The GNSS may include, for example, at least one of a Global Positioning System (GPS), a Global navigation satellite system (Glonass), a Beidou Navigation satellite system (hereinafter, referred to as "Beidou"), Galileo, and the European Global satellite-based navigation system according to a place of usage, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), a Plain Old Telephone Service (POTS), and the like. The network 162 may include at least one of a communication network such as a computer network (for example, a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations executed in the electronic device 101 may be executed in another electronic device or a plurality of electronic devices (for example, the electronic devices 102 and 104 or the server 106). According to an embodiment, when the electronic device 101 has to perform some functions or services automatically or in response to a request, the electronic device 101 may request another device (for example, the electronic device 102 or 104 or the server 106) to perform at least some functions relating thereto instead of, or in addition to, performing the functions or services by itself. The other electronic device (for example, the electronic device 102 or 104 or the server 106) may perform the requested functions or the additional functions and may transfer the execution result to the electronic device 101. The electronic device 101 may provide the received result as it is, or may additionally process the received result to provide the requested functions or services. To this end, for example, cloud computing, distributed computing, or client-server computing technology may be used.

Hereinafter, an electronic device according to various embodiments of the present disclosure will be described with reference to the accompanying drawings.

Figure 2:
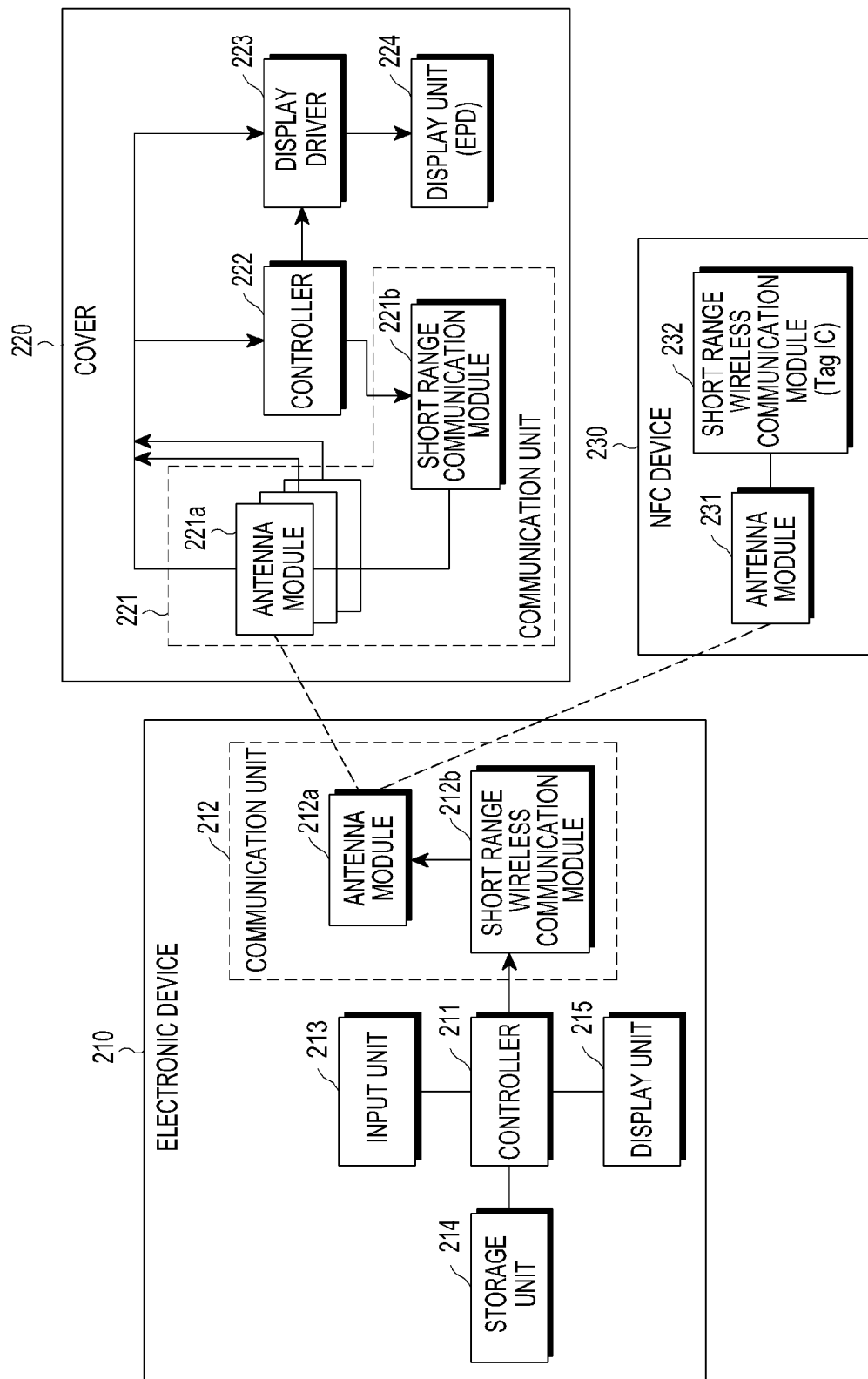
FIG. 2 illustrates an example of a configuration of an electronic device and external devices within a network environment according to various embodiments of the present disclosure.

FIG. 2 illustrates a configuration example of an electronic device and external devices within a network environment according to various embodiments of the present disclosure.

Referring to FIG. 2, according to various embodiments of the present disclosure, the network environment corresponds to a network for wireless short range communication and may include an electronic device 210 and an external device (for example, at least one of an accessory device (for example, a cover 220) and an NFC device 230, or an electronic device 102 or 104) connected through the short range wireless communication.

The electronic device 210 (for example, the electronic device 101 of FIG. 1) may include at least one of a controller 211, a communication unit 212, an input unit 213, a storage unit 214, and a display unit 215. According to various embodiments of the present disclosure, the controller 211 (for example, the processor 120 of FIG. 1) may process information according to an operation of the electronic device, or information according to an execution of a program, an application, or a function, and may make a control to display the processed information on the display unit 215 or to output the processed information through an audio module (not shown).

According to various embodiments of the present disclosure, the controller 211 may make a control to display various type of information (contents) in entire or partial areas of the screen of the display unit.

Further, according to various embodiments of the present disclosure, the controller 211 may make a control to perform short range wireless communication with external devices and make a control to transmit/receive data to/from the external device (for example, the cover 220 or the NFC device 230) through the short range wireless communication.

According to various embodiments, the controller 211 may transmit at least one piece of information which may be displayed on the display unit 215 or information generated according to a particular event to the external device (for example, the cover 220) connected through the wireless short range communication (NFC) and control the external device (for example, the cover 220) to display the received information. The event may include at least one of recognition of coupling of the cover 220 to the electronic device 210, an execution of an application for a cover operation, and generation of information according to a set function (for example, at least one of a phone call, a message, and a set event).

According to various embodiments of the present disclosure, the controller 211 may periodically search for a wireless signal (for example, an NFC signal) generated by external devices that are located near the electronic device 210 and capable of performing short range wireless communication and identify the external devices capable of performing the short range wireless communication through the found wireless signal. According to various embodiments, the controller 211 may divide time during a preset period, set a time internal corresponding to each of short range wireless communication types, search for a wireless signal (for example, an NFC signal) of the corresponding type at the set time, and identify whether there is a neighboring external device corresponding to the corresponding type.

Further, according to various embodiments of the present disclosure, when short range wireless communication is performed with the neighboring external device (for example, the cover 220) requiring power, the controller 211 may set a connection with the cover 220 and supply wireless power to the cover 220 through an induced current of at least one antenna included in an antenna module 212*a*. Accordingly, the wireless power may be supplied to the cover 220 for a predetermined time and the cover 220 may transmit a response signal to the electronic device 210. Further, when receiving the response signal that informs of the driving of the cover 220, the controller 211 may perform a short range wireless communication connection with the cover 220 for data transmission/reception and transmit/receive data to/from the cover 220.

According to various embodiments, when the cover 220 is connected, the controller 211 may recognize the cover 220, make a short range wireless communication (for example, NFC) connection, read information on the cover 220, execute an application for an operation of the cover 220, and transmit configuration information indicating the set operation of the cover 220 through the executed application to the cover 220 based on the short range wireless communication. After transmitting the configuration information, the controller 211 may disconnect the short range wireless communication connected to the cover 220, switch to a standby mode state, and search for another external device (for example, the NFC device).

According to various embodiments, the controller 211 may identify whether an event for the cover 220 is generated and, when the event is generated, may transmit information (hereinafter, referred to as event information) related to the generated event to the cover 220 through NFC. The controller 211 may identify whether an operation for displaying the event information transmitted by the cover 220 is completed and, when the displaying of the event information is completed, may stop the NFC with the cover 220. When the NFC with the cover 220 is stopped, the controller 211 may switch to the standby mode again and search for an NFC signal, that is, whether there is an approaching NFC device (for example, an NFC polling operation).

According to various embodiments, the controller 211 may ignore signals generated by other NFC devices during the NFC with the cover 220 and first perform the NFC with the cover 220. Further, according to various embodiments, the controller 211 may not perform the operation of searching for the NFC signal that is performed in the standby mode while the NFC with the cover 220 is performed, and, when switching to the standby mode, perform the operation of searching for the NFC signal.

Further, according to various embodiments of the present disclosure, the controller 211 may determine generation of a first event by the cover 220 and, when the first event is generated, may supply power to the cover 220 and determine whether a second event is generated using the NFC for a predetermined time during which power is supplied to the cover. In addition, when the operation of the cover is identified after the predetermined time passes, the controller 211 may transmit first event information to the cover through the NFC. Accordingly, the cover may display the first event information according to the first event. When the second event is generated while the first event information is transmitted to the cover through the NFC, the controller 211 may first transmit the first event information to the cover through the NFC regardless of the second event.

Further, according to various embodiments of the present disclosure, the controller 211 may include an NFC control module (not shown) for controlling short range wireless communication with the cover 220 or the external device (for example, the NFC device 230) and a power control module (not shown) for controlling an operation for battery charging or discharging through a wireless charging scheme and controlling an operation of supplying power to at least one external device (for example, the cover 220 or the NFC device 230). According to various embodiments, the power control module (not shown) may be configured separately from the controller 211 and may charge power wirelessly supplied through the antenna module 212*a* in a battery (not shown) according to a control of the controller 211. Further, according to various embodiments, the controller 211 may include a separate cover control module (not shown) for controlling the operation of the cover. According to various embodiments, in a case where, for example, an NFC polling operation is used, when the standby mode state is maintained and the NFC control module of the controller 211 receives a control signal, the cover control module may switch to a cover mode, operate in the cover mode for a predetermined time, and switch back to the standby mode. The cover control module may control the antenna module 212*a* to be activated in the cover mode, and make a control to transmit an RF signal including information related to a cover event to the cover 220 through the antenna module 212*a*. Further, according to various embodiments, the cover control module may receive information on a search period (for example, an NFC polling period) from the controller 211 and, when a cover mode time interval arrives, switch to the cover mode even though the control signal is not received from the controller 211 based on the information on the received search period. All functions of the cover control module according to the various embodiments as described above may be included in the controller 211 and performed by the controller 211.

Further, according to various embodiments, when a wireless charging operation is activated and the controller 211 switches to the cover mode in a state where power is supplied to the battery, the controller 211 may deactivate the wireless charging operation, transmit a wireless (RF) signal including event information generated in the cover mode to the cover through the antenna module 212*a*, and supply power to the cover 220. In addition, according to various embodiments, when the wireless charging operation is activated and an event is generated in the cover mode in the state where power is supplied to the battery, the controller 211 may deactivate the wireless charging operation, transmit a wireless signal including event information according to generation of the event to the cover 220, and supply power to the cover 220. When the transmission of the event information is completed, the controller 211 may make a control to activate the wireless charging operation again and wirelessly charge the battery. When a wireless charging antenna (not shown) is activated according to the wireless charging operation, the wireless signal by NFC may receive interference by the wireless charging operation. Accordingly, the controller 211 may deactivate the wireless charging operation in the cover mode or when the event is generated in the cover mode.

Further, according to various embodiments, when the wireless charging is performed, that is, the wireless charging operation is activated, the controller 211 may maintain a connected state (NFC attach) without releasing the connection with the antenna module 212*a*. When the switching to the cover mode is made and the event is generated, the controller 211 may control transmission power (Tx power) for wireless charging to be lower so that the wireless signal through NFC can be transmitted without any interference by the wireless charging.

According to various embodiments, the controller 211 may correspond to a hardware module or a software module (for example, an application program) and may be a hardware component (function) or a software component (program) including at least one of various sensors included in the electronic device, a data measurement module, an input/output interface, a module for managing a state or an environment of the electronic device, and a communication module.

Further, according to various embodiments of the present disclosure, the controller 211 of the electronic device may be at least a part of the processor, and may include, for example, a combination of one or more of hardware, software, and firmware. According to various embodiments, the controller 211 may omit at least some of the aforementioned elements or may further include other elements for performing an image processing operation as well as the aforementioned elements.

According to various embodiments of the present disclosure, at least some elements of the controller 211 of the electronic device may include, in hardware, at least some of at least one processor including a Central Processing Unit (CPU)/Micro Processing Unit (MPU), a memory (for example, a register and/or a Random Access Memory (RAM)) to which at least one piece of memory loading data is loaded, and a bus for inputting/outputting at least one piece of data to the processor and the memory. Further, the controller 211 may include, in software, a predetermined program routine or program data which is loaded to the memory from a predetermined recording medium to perform a function defined in the electronic device and operation-processed by the processor.

According to various embodiments of the present disclosure, the communication unit 212 (for example, the communication interface 170 of FIG. 1) of the electronic device may communicate with another electronic device or an external device (for example, the electronic device 102 or 104 of FIG. 1 or the server 106) according to a control of the controller 211. According to various embodiments, the communication unit 212 may transmit/receive data related to an executed operation to/from the external device according to a control of the controller 211. The communication unit 212 may be connected to the network using wireless communication or wired communication through the communication interface or perform communication through a connection between devices. The wireless communication may include at least one of, for example, Wi-Fi, Bluetooth™ (BT), Near Field Communication (NFC), Global Positioning System (GPS), and cellular communication (for example, LTE, LTE-A, CDMA, WCDMA, UMTS, WiBro, GSM or the like). The wired communication may include at least one of, for example, a Universal Serial Bus (USB), a High Definition Multimedia Interface (HDMI), Recommended Standard 232 (RS-232), a Plain Old Telephone Service (POTS), a Universal Asynchronous Receiver Transmitter (UART), an Inter-Integrated Circuit (I2C), a Serial Peripheral Interface (SPI), and a Controller Area Network (CAN). Further, the communication unit 212 may include all types of communication schemes which have been widely known or will be developed in the future as well as the aforementioned communication schemes.

According to various embodiments of the present disclosure, the communication unit 212 may be connected to at least one neighboring external device (for example, the cover 220 or the NFC device 230) (for example, the electronic device 102 or 104 of FIG. 1) capable of performing short range wireless communication and perform short range wireless communication.

According to various embodiments of the present disclosure, when the cover 220 is connected to the housing according to a control of the controller 211, the communication unit 212 may transmit/receive a signal for a short range communication connection to/from the cover 220 and, when the short range communication is connected, transmit/receive data.

According to various embodiments of the present disclosure, the communication unit 212 may include at least one antenna (for example, the antenna module 212*a* including an NFC antenna) for short range wireless communication or a short range wireless communication module 212*b* (for example, an NFC chip (IC)). The antenna module 212*a* may transmit/receive a signal for an NFC connection and data transmission/reception. Further, when the external device (for example, the cover 220) to which power will be supplied is connected, the antenna module 212*a* may generate an induced current and supply wireless power to the cover 220. The short range wireless communication module 212*b* may include a function for the short range wireless communication and perform the function according to a control of the controller 211. According to various embodiments, when the number of antenna modules 212a is plural, the antenna modules 212a may be divided into a main antenna for transmitting/receiving a wireless signal and an antenna for supplying wireless power. Further, according to various embodiments of the present disclosure, the communication unit 212 may further include an antenna (for example, a wireless power loop coil) for wireless charging to supply wireless power to a battery.

According to various embodiments of the present disclosure, the input unit 213 of the electronic device (for example, the input/output interface 150 of FIG. 1) may transfer, to the controller 211, various pieces of information such as number and character information input by the user, various function settings, and signals which are input in connection with a control of functions of the electronic device. Further, the input unit 213 may support a user input for executing a module or an application that supports a particular function. The input unit 213 may include at least one of a key input means such as a keyboard or a keypad, a touch input means such as a touch sensor or a touch pad, a sound source input means, a camera, various sensors, and a gesture input means. In addition, the input unit 213 may include all types of input means which are being developed currently or will be developed in the future. According to various embodiments of the present disclosure, the input unit 213 may receive information input by the user from the user through a touch panel of the display unit or a camera and may transfer the input information to the controller 211.

According to various embodiments of the present disclosure, the input unit 213 may transfer information related to a user's gesture received through the camera or various sensors to the controller 211. Further, the input unit 213 may transfer an input signal according to a selection of at least one object (for example, content) displayed on the screen to the controller 211.

According to various embodiments of the present disclosure, the input unit 213 may receive an input signal for switching a mode from the user through the sound source input means and transfer the input signal to the controller 211.

According to various embodiments, when an application for NFC with the cover 220 is executed as the mounting of the cover 220 is recognized, the input unit 213 may receive user input information for a function provided by the executed application. Further, the input unit 213 may receive setting information for short range communication from the user.

According to various embodiments of the present disclosure, the storage unit 214 (not shown) (for example, the memory 130 of FIG. 1) of the electronic device may temporarily store various pieces of data generated during an execution of programs including a program used for a function operation according to various embodiments. The storage unit 214 may largely include a program area and a data area. The program area may store pieces of information related to driving of the electronic device such as an Operating System (OS) that boots the electronic device. The data area may store transmitted/received data or generated data according to various embodiments. Further, the storage unit 214 may include at least one storage medium of a flash memory, a hard disk, a multimedia card micro type memory (for example, an SD or XD memory), a RAM, and a ROM.

According to various embodiments of the present disclosure, the storage unit 214 may store information for short range wireless communication with an external device (for example, the cover 220 or the NFC device 230) and transmitted/received data.

According to various embodiments of the present disclosure, the display unit 215 (for example, some elements of the input/output interface 150 of FIG. 1 or the display 160) of the electronic device may output operation execution result information (for example, at least one of text, images, or videos) according to a control of the controller 211.

According to various embodiments of the present disclosure, the display unit 215 may display an input pad (for example, a button) for inputting at least one of various characters, numbers, or symbols into an input window on the screen through various methods. Further, the display unit 215 may display a service execution screen according to an execution of various applications related to information transmission/reception. According to various embodiments, the display unit 215 may execute and display an application for short range wireless communication with the cover 220. Further, the display unit 215 may display information on a function executed according to set conditions or user input information and, when at least one piece of the displayed information is transmitted to the cover 220 and displayed, may not display at least one piece of the transmitted information. That is, when an event for the cover is generated and event information is transmitted to the cover 220, the display unit 215 may not display the event information.

According to various embodiments of the present disclosure, when the display unit 215 of the electronic device is implemented in the form of a touch screen, the display unit 215 may correspond to the touch screen of the input unit (not shown). When the display unit 215 and the input unit 213 are implemented together in the form of the touch screen, the display unit 215 may display various pieces of information generated according to a user's touch action.

According to various embodiments, the display unit 215 may be configured by at least one of a Liquid Crystal Display (LCD), a Thin Film transistor LCD (TFT-LCD), an Organic Light Emitting Diodes (OLEDs), LED, Active Matrix OLED (AMOLED), a flexible display, and a 3 dimensional display. Some of the displays may be implemented in a transparent type or a light transmission type so that the outside can be seen therethrough. The display may be implemented in a transparent display form including Transparent OLED (TOLED).

According to various embodiments of the present disclosure, the electronic device 210 may further include another installed display unit (for example, an extended display unit or a flexible display unit) as well as the display unit 215 and a display unit of another external electronic device (for example, at least one of an external display device, a wearable device, and an external terminal device) linked to the electronic device.

According to various embodiments of the present disclosure, the electronic device may further include an audio module (not shown) (for example, the input/output interface 150 of FIG. 1). The audio module may output a sound and may include, for example, at least one of an audio codec, a microphone (MIC), a receiver, an earphone output (EAR_L), and a speaker. According to various embodiments, when voice information corresponding to the event information transmitted to the external device (for example, the cover 220) through short range wireless communication is identified, the audio module may output the identified voice information in accordance with the event information displayed on the cover 220. According to various embodiments, the audio module may output various pieces of voice information for short range wireless communication.

According to various embodiments of the present disclosure, the electronic device may further include a means for outputting vibration or a means for outputting smell.

According to various embodiments of the present disclosure, main elements of the electronic device have been described through the electronic device of FIG. 2. However, according to various embodiments of the present disclosure, all the elements illustrated in FIG. 2 are not necessary elements, and the electronic device may be implemented by more or less elements than the illustrated elements. Further, locations of the main elements of the electronic device illustrated in FIG. 2 may vary depending on various embodiments.

Referring back to FIG. 2, according to various embodiments of the present disclosure, the first external device may be an accessory device (for example, the cover 220) linked with the electronic device 210, and may include at least one of a communication unit 221, a controller 222, a display driver 223, and a display unit 224. Further, according to various embodiments, the cover 220 may further include the controller 222, the antenna module 221a including at least one short range wireless communication antenna of the communication unit 221, or a rectifier circuit unit connected to the display driver 223 to supply power.

Further, the cover 220 may be implemented to be connected to the housing of the electronic device 210.

According to various embodiments, the cover 220 may be implemented to cover the back surface of the electronic device 210.

According to various embodiments of the present disclosure, the communication unit 221 may include the antenna module 221a including at least one antenna for short range wireless communication and a short range wireless communication module 221b (for example, the NFC chip (IC)). The antenna module 221a may transmit/receive a signal for an NFC connection and data transmission/reception. Further, when the device (for example, the electronic device 210) to receive power is connected, the antenna module 212a may receive a wireless power signal, generate an induced current according to the received wireless power signal, and apply the power to the controller 222, the display driver 223, and the display unit 224. The short range wireless communication module 212b may include a function for the short range wireless communication and perform the function according to a control of the controller 222. According to various embodiments of the present disclosure, when the number of antennas included in the antenna module 221a is plural, the plurality of antennas may be disposed according to an antenna pattern of the electronic device 210, and one predetermined antenna may operate as a main antenna for transmitting/receiving a wireless signal and at least one remaining antenna may operate as an antenna for receiving wireless power.

According to various embodiments, when the communication unit 221 is connected to the electronic device 210, the communication unit 221 may receive the wireless power signal from the electronic device 210 and generate an induced current in the controller 222. When a response signal according to device driving is received from the controller 222, the communication unit 221 may transmit the response signal to the electronic device 210. Further, in order to transmit/receive data (for example, setting information, event information, or operation completion information), the communication unit 221 may transmit/receive a signal for performing a short range wireless communication connection, and receive event information from the electronic device 210 as the event is generated and short range wireless communication is connected. In addition, the communication unit 221 may transmit information on the operation completion transmitted from the controller 222 to the electronic device 210.

According to various embodiments of the present disclosure, the controller 222 (for example, a Micro Controller Unit (MCU) or a Field Programmable Gate Array (FPGA)) may perform a general control operation of the cover 220 and process information according to the operation of the cover 220 or an execution of a program, an application, or a function. Further, the controller 222 may transmit the processed information to the display unit 224 through the display driver 223 and make a control to display the processed information. The controller 222 may transmit the processed information to the communication unit 221 and make a control to transmit the processed information to the device (for example, the electronic device 210) connected through short range wireless communication.

According to various embodiments of the present disclosure, when the controller 222 is connected to the electronic device 210, the controller 222 may receive an induced current generated by the antenna module 221a and make a control to operate the cover 220. According to various embodiments, when wireless power is supplied for a predetermined time, the controller 222 may turn on the cover 220.

According to various embodiments, the controller 222 may generate a response signal according to device driving and make a control to transmit the response signal to the electronic device 210, and may perform an operation for a short range wireless communication connection with the electronic device 210. Further, as the short range wireless communication is connected, the controller 222 may make a control to transmit/receive information for an authentication of the cover 220 to/from the electronic device 210 and process an authentication performance operation. The controller 222 may process event information transmitted from the electronic device 210 and make a control to display the received event information on the display unit 224.

According to various embodiments, the controller 222 may identify whether the event information is completely displayed and, when the event information is completely displayed, make a control to transmit an operation completion signal including information on the completion of the displaying to the electronic device 210.

According to various embodiments, the controller 222 may make a control to apply power to the display unit 224 to maintain the displaying of the event information on the display unit 224 even in a state where the short range wireless communication connection with the electronic device 210 is released. For example, when short range wireless communication is connected through one antenna included in the antenna module 221a and power is supplied therethrough, the controller 222 may control the one antenna to receive wireless (RF) power signal for a predetermined time even in a state where the short range wireless communication connected is blocked.

According to various embodiments, in a case where the number of NFC antennas is plural, if wireless power is supplied through a sub antenna for supplying auxiliary power even in a state where short range wireless communication connection through a main antenna is blocked, the controller 222 may make a control to apply the supplied power to the display unit 224.

According to various embodiments of the present disclosure, the controller 222 of the cover 220 may be at least a part of the processor, and may include, for example, a combination of one or more of hardware, software, and firmware. According to various embodiments, the controller 222 may omit at least some of the aforementioned elements or may further include other elements for performing an image processing operation as well as the aforementioned elements.

According to various embodiments of the present disclosure, at least some elements of the controller 222 may include, in hardware, at least some of at least one processor including a Central Processing Unit (CPU)/Micro Processing Unit (MPU), a memory (for example, a register and/or a Random Access Memory (RAM)) to which at least one piece of memory loading data is loaded, and a bus for inputting/outputting at least one piece of data to the processor and the memory. Further, the controller 222 may include, in software, a predetermined program routine or program data which is loaded to the memory from a predetermined recording medium to perform a function defined in the electronic device and operation-processed by the processor.

According to various embodiments of the present disclosure, the display unit 224 may display data (for example, event information) received from the electronic device 210. The event information may be information transmitted by the electronic device 210 according to event generation and may include information for temporary notification of text or images or information that requires successive operations in the form of animation.

According to various embodiments of the present disclosure, the display unit 224 of the cover 220 may use a storable reflective display having no power consumption on a stopped screen and may be configured in the form of, for example, at least one of E-ink, Electrophoretic Display (EPD), and cholesteric LCD.

According to various embodiments, when the display unit 224 of the cover 220 can be driven with low power or sufficient power is supplied to the display unit 224, the display unit 224 may be configured by one or more of a Liquid Crystal Display (LCD), a Thin Film transistor LCD (TFT-LCD), an Organic Light Emitting Diode (OLED), LED, Active Matrix OLED (AMOLED), a flexible display, and a 3 dimensional display. Some of the displays may be implemented in a transparent type or a light transmission type so that the outside can be seen therethrough. The display may be implemented in a transparent display form including Transparent OLED (TOLED).

Referring to FIG. 2, the second external device (for example, the NFC device 230) may include an NFC antenna 231 and a tag chip (IC) 232 for NFC. When the second external device is found in a standby mode state of the electronic device 210 and is connected to the electronic device 210 through NFC, the second external device may transmit card information to the electronic device 210 that is driven and serves as a reader.

Figure 3:
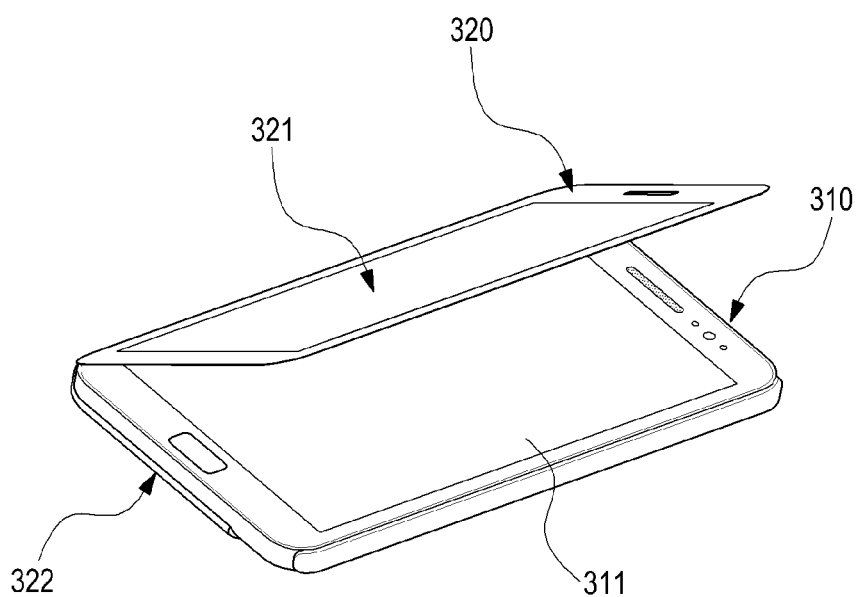
FIG. 3 illustrates an example of a configuration of an electronic device according to various embodiments of the present disclosure.

FIG. 3 illustrates an example of a configuration of an electronic device according to various embodiments of the present disclosure.

Referring to FIG. 3, a cover 320 (for example, the cover 220 of FIG. 2) may be connected to an electronic device 310 (for example, the electronic device 101 of FIG. 1 or the electronic device 210 of FIG. 2) to cover a screen of a display unit 311 (for example, the display 160 of FIG. 1 or the display unit 215 of FIG. 1) disposed on a first surface of the housing of the electronic device 310 according to various embodiments of the present disclosure. The cover 320 may have a display unit 321 (for example, the display unit 224 of FIG. 2) disposed on a back surface that covers a screen area of the display unit 311 of the electronic device 310, and a short range communication module 322 (for example, the communication unit 221 of FIG. 2) for a connection of short range communication (for example, NFC) may be disposed in one area of a second surface of the electronic device 310.

Figure 4:
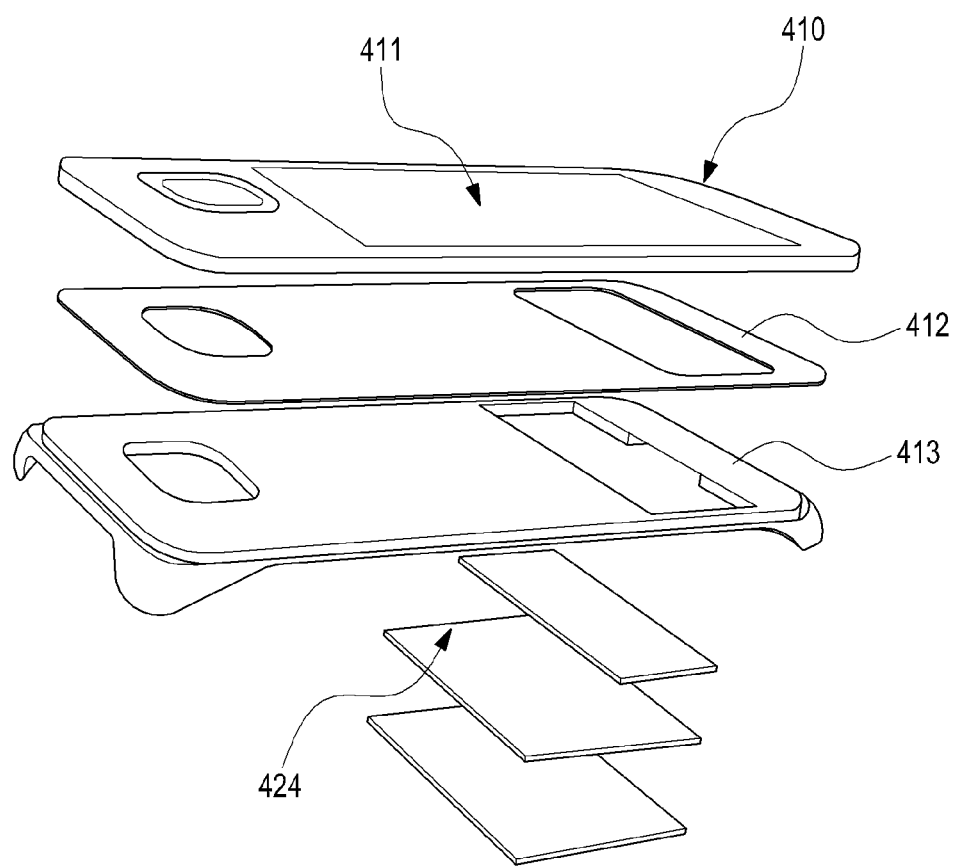
FIG. 4 illustrates an example of a configuration of an electronic device according to various embodiments of the present disclosure.

FIG. 4 illustrates an example of a configuration of an electronic device according to various embodiments of the present disclosure.

Referring to FIG. 4, a cover 410 (for example, the cover 220 of FIG. 2 or the cover 320 of FIG. 3) according to various embodiments of the present disclosure may be connected to cover the back surface of the housing of the electronic device (for example, the electronic device 101 of FIG. 1, the electronic device 210 of FIG. 2, or the electronic device 310 of FIG. 3). The cover 410 may include a display unit 411 (for example, the display unit 224 of FIG. 2) mounted on cover members 412 or 413. Further, the cover 410 may include an NFC module 424 (or a communication unit of the cover) disposed on the surface connected to the electronic device. For example, in order to increase efficiency of received power, the cover 410 may allow at least one NFC antenna included in the NFC module 424 to arrange according to an NFC antenna pattern of the electronic device.

The cover according to the various embodiments of the present disclosure as described above may be configured in various forms as well as the form of the cover 320 of FIG. 3 or the cover 410 of FIG. 4.

Figure 5:
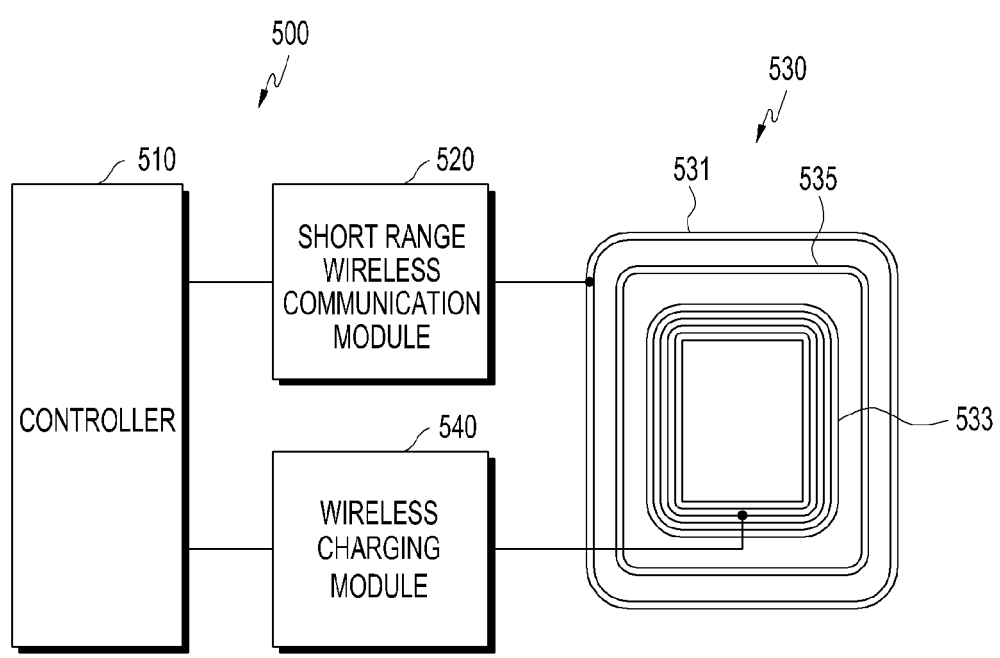
FIG. 5 illustrates an example of a configuration of an electronic device according to various embodiments of the present disclosure.

FIG. 5 illustrates an example of a configuration of an electronic device according to various embodiments of the present disclosure.

Referring to FIG. 5, according to various embodiments of the present disclosure, when a controller 510 (for example, the processor 120 of FIG. 1 or the controller 211 of FIG. 2) activates short range wireless communication, an electronic device 500 (for example, the electronic device 101 of FIG. 1, the electronic device 210 of FIG. 2, or the electronic device 310 of FIG. 3) may transmit a control signal to a short range wireless communication module 520 (for example, the communication unit 212 of FIG. 2). Accordingly, the short range wireless communication module 520 (for example, the short range wireless communication module 212*b* of FIG. 2) may access an NFC antenna 531 (NFC loop coil) included in an antenna module 530 (for example, the antenna module 212*a* of FIG. 2) and activate NFC. Further, the electronic device may release a connection of an antenna 533 (wireless power loop coil) for wireless charging with a wireless charging module 540 or block communication for wireless charging. The NFC antenna 531 and the antenna 533 for wireless charging may be disposed in adjacent areas to each other and, accordingly, interference may be generated therebetween. Further, referring to FIG. 12, the antenna module 530 may include at least one other antenna 535 used in another communication scheme or another mode (for example, an NFC payment mode) in an area adjacent to the NFC antenna 531 and the antenna 533 for wireless charging.

Figure 6:
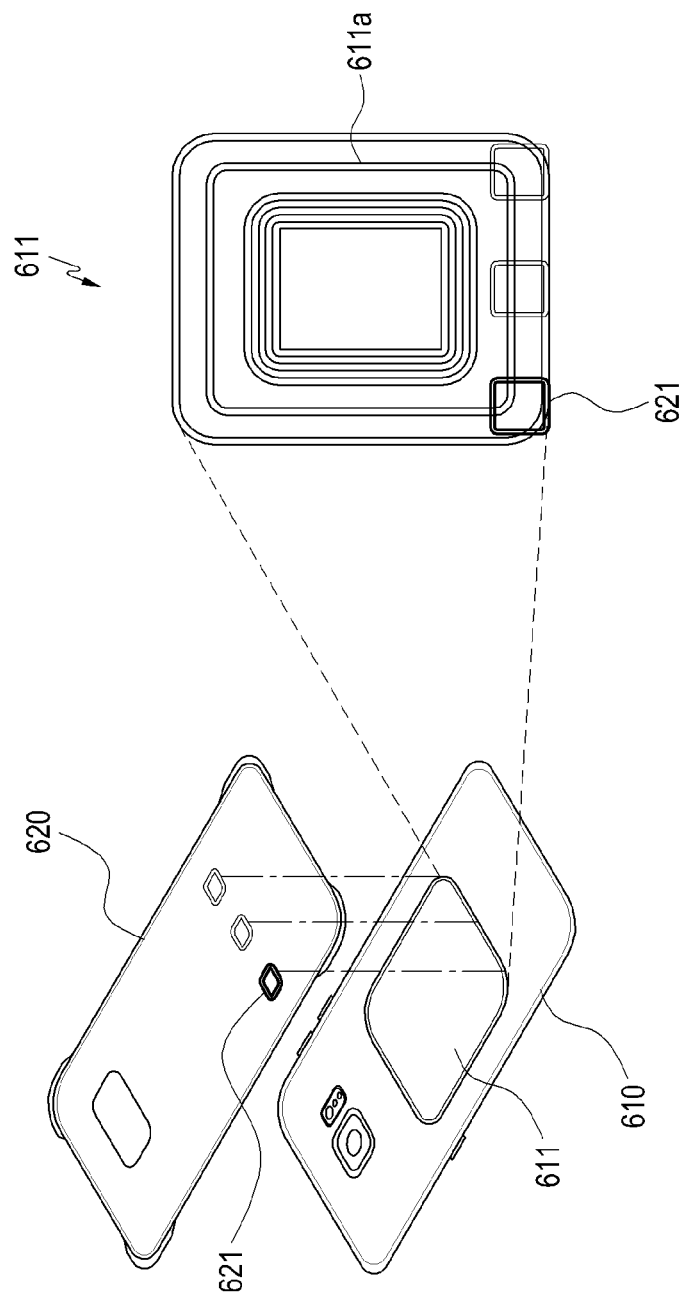
FIG. 6 illustrates an example of an antenna configuration of a cover connected to an electronic device according to various embodiments of the present disclosure.

FIG. 6 illustrates an example of an antenna configuration of a cover connected to an electronic device according to various embodiments of the present disclosure.

Referring to FIG. 6, according to various embodiments of the present disclosure, a cover 620 (for example, the cover 220 of FIG. 2, the cover 320 of FIG. 3, or the cover 410 of FIG. 4) may be mounted to an electronic device 610 (for example, the electronic device 101 of FIG. 1, the electronic device 210 of FIG. 2, the electronic device 310 of FIG. 3, or the electronic device 500 of FIG. 5). When the cover 620 is mounted to the electronic device 610, an antenna 621 (for example, the antenna module 221*a* of FIG. 2) for NFC of the cover 620 may be connected to an antenna module 611 (for example, the antenna module 212*a* of FIG. 2). The antenna 621 of the cover 620 may be arranged on the cover 620 for an access according to an antenna pattern of the antenna 611*a* of the antenna module 611 of the electronic device 610. According to various embodiments, the cover 620 may further include at least one antenna for supplying auxiliary power as well as the antenna 621 used for a cover mode operation. The number and sizes of antennas arranged on the cover 620 may vary depending on power supplied to the cover 620. According to various embodiments, when the cover 620 includes a plurality of antennas, among the included antennas, the antenna 621 arranged according to the antenna pattern on the electronic device may be activated and the remaining antennas may be deactivated.

Figure 7:
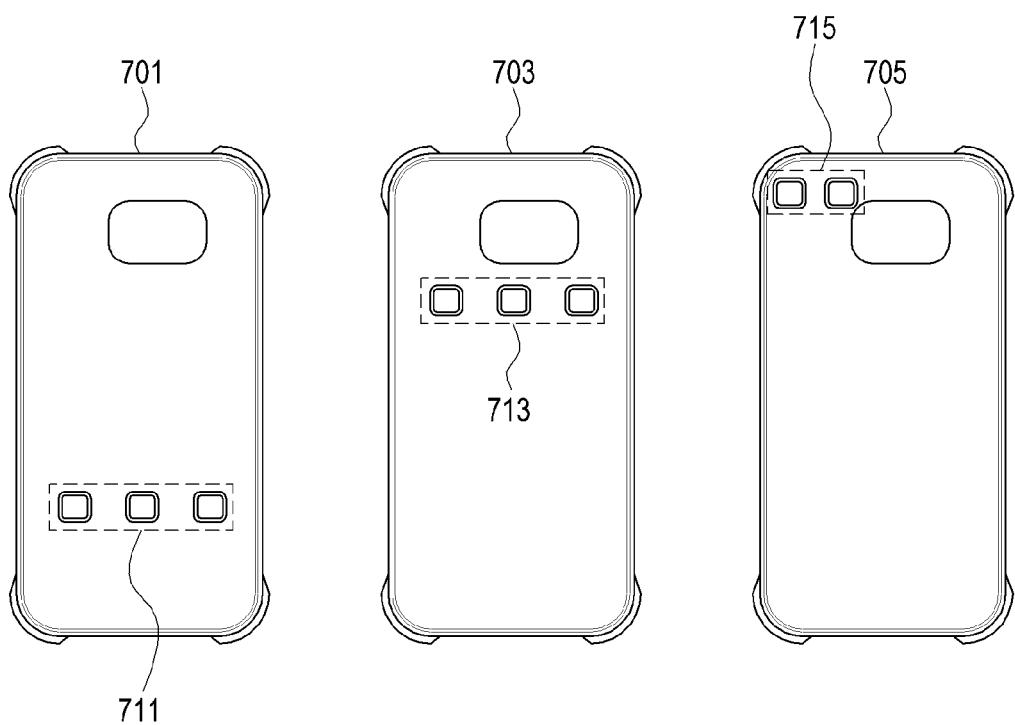
FIG. 7 illustrates an example of an antenna configuration of a cover connected to an electronic device according to various embodiments of the present disclosure.

FIG. 7 illustrates an example of an antenna configuration of a cover connected to an electronic device according to various embodiments of the present disclosure.

According to various embodiments of the present disclosure, a cover 701, 703, or 705 (for example, the cover 220 of FIG. 2, the cover 320 of FIG. 3, or the cover 410 of FIG. 4) may include at least one antenna 711, 713, or 715 arranged at various locations and forms in a particular area (for example, a central area, an upper area, or an edge line) according to a type of each electronic device. At least one antenna 711, 713, or 715 of the cover 701, 703, or 705 may be configured in a spiral, meander line, or sing loop form and a multi-antenna pad type. The multi-antenna pad may be configured separately and used for various types of covers and electronic devices. Further, the cover according to various embodiments of the present disclosure may include an antenna arranged in various forms as well as the aforementioned forms illustrated in FIG. 7.

An electronic device according to one of various embodiments of the present disclosure may include a communication unit for communicating with a cover connected to the electronic device through short range wireless communication, and a controller. The controller may determine generation of an event related to the cover, supplies power to the cover through wireless communication when the event is generated, make a control to transmit event information to the cover through the short range wireless communication to display the information related to the generated event on the cover when the cover is driven by the supplied power, and switch to a standby mode after releasing a communication connection with the cover when an operation of the cover according to the event is completed.

According to various embodiments of the present disclosure, the controller may not recognize another external device while the event information is transmitted to the cover.

According to various embodiments of the present disclosure, the controller may search for the cover during a time interval of an N search period corresponding to the cover and, when the time interval corresponding to the cover passes, search for another external device corresponding to another time interval of the search period.

According to various embodiments of the present disclosure, the controller may transmit the information related to the event to the cover for the time interval corresponding to the cover and, when the time interval corresponding to the cover set in accordance with the cover passes and the other time interval is selected, determine that the operation of the cover is completed.

According to various embodiments of the present disclosure, even when the connection of the short range wireless communication with the cover is released, the controller may maintain an operation for supplying the power to the cover for a preset time by using a routine different from a routine for connecting the short range wireless communication.

According to various embodiments of the present disclosure, the controller may calculate an operation time of the cover by analyzing the information related to the event and, when the calculated operation time passes, determine that the operation of the cover is completed.

According to various embodiments of the present disclosure, when a tag signal including information indicating the completion of the operation is received from the cover, the controller may determine that the operation of the cover is completed.

According to various embodiments of the present disclosure, when the electronic device releases the connection of the short range wireless communication with the cover, switches to the standby mode, and performs an operation in the standby mode, if another external device is not recognized, the controller may maintain an operation for supplying the power to the cover for a preset standby time.

According to various embodiments of the present disclosure, when the cover is driven, the controller may receive authentication information of the cover, perform an authentication, and then perform an operation for the connection of the short range wireless communication with the cover.

An accessory device (for example, the cover 220 of FIG. 2) according to one of various embodiments of the present disclosure may include a housing including a first surface and a second surface facing an opposite side to the first surface, a connecting structure connected to the housing and making the second surface attachable to/detachable from one surface of an external electronic device, a display formed on at least a part of the first surface, and a control circuit disposed inside the housing and electrically connected to the display, wherein the control circuit may include a conductive pattern arranged inside the housing near the second surface of the housing to receive a magnetic flux generated from the one surface of the external electronic device and/or a transmitted signal, a power storage device that at least temporarily stores power induced by the magnetic flux; and a memory device that temporarily stores at least a part of information included in the transmitted signal, and at least a part of the display may be activated using at least the part of the information and the power.

According to various embodiments of the present disclosure, the memory device may pre-store data on at least one of an image, text, and a figure pattern to be displayed at least the part of the display, and the control circuit may select at least a part of the data at least partially based on at least the part of the information included in the transmitted signal and activate at least the part of the display by using at least the selected part of the data.

A device (for example, the cover 220 of FIG. 2) according to one of various embodiments of the present disclosure may include a housing including a first surface facing a first direction and a second surface facing a second direction opposite to the first direction, a connecting structure that makes the housing attachable to/detachable from a back surface of an external device to allow the second surface to face the back surface of the external device, a short range communication circuit that receives wireless power and at least one signal from the external device through the back surface of the external device, the short range communication circuit being located inside the housing, a control circuit located inside the housing and electrically connected to the short range communication circuit, and at least one display element exposed to the first surface of the housing, wherein the display element may include a container, liquid within the container, and a plurality of particles distributed in the liquid, and the control circuit may move at least some of the plurality of particles existing in at least one of text and an image to the first surface in response to the at least one signal from the external device.

An operation procedure for short range wireless communication in the above described electronic device will be described in detail with reference to the accompanying drawings.

Figure 8:
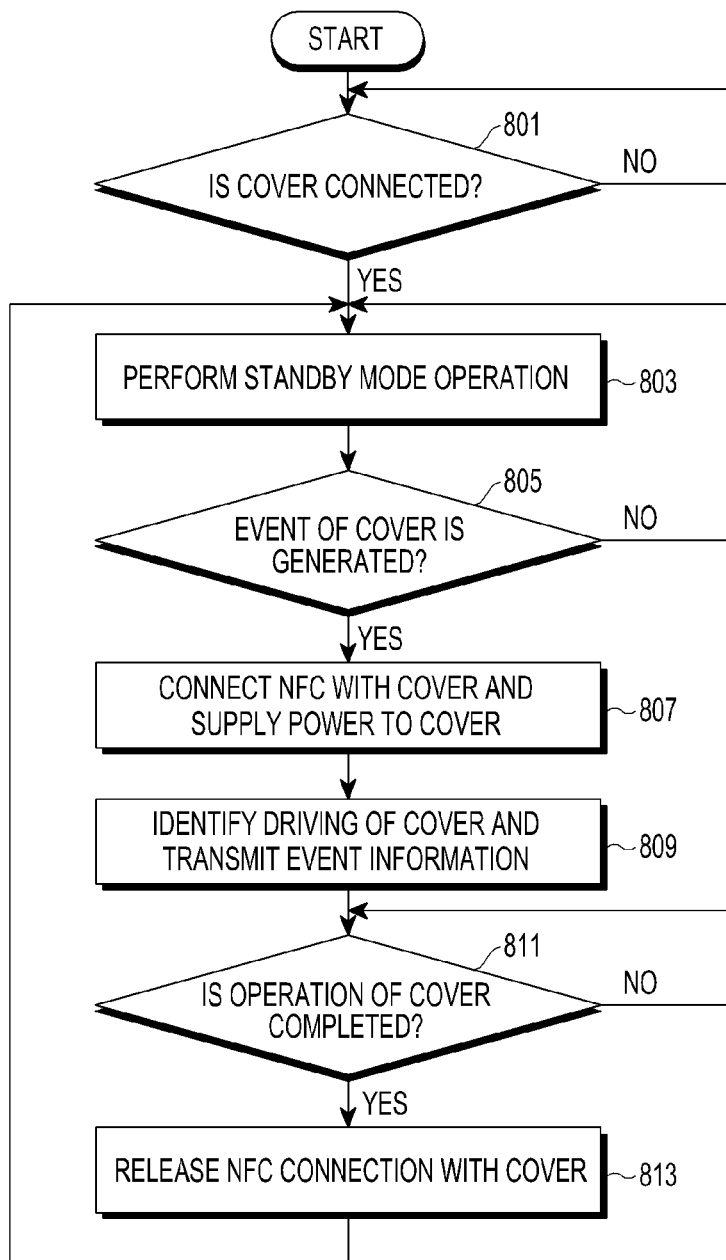
FIG. 8 illustrates an example of an operation procedure of the electronic device according to various embodiments of the present disclosure.

FIG. 8 illustrates an example of an operation procedure of an electronic device according to various embodiments of the present disclosure.

Referring to FIG. 8, according to various embodiments of the present disclosure, in operation 801, the electronic device (for example, the electronic device 101 of FIG. 1, the electronic device 210 of FIG. 2, or the electronic device 310 of FIG. 3) may identify whether the cover (for example, the electronic device 102 or 104 of FIG. 1, the electronic device 210 of FIG. 2, the cover 320 of FIG. 3, or the cover 410 of FIG. 4) is connected to the housing, recognize a cover connected state, and perform a setting operation according to the coupling of the cover. When it is identified that the cover is connected based on a result of the identification of operation 801, the electronic device may perform operation 803.

In operation 803, the electronic device may perform a standby mode operation. The standby mode operation may include at least one of an operation of periodically searching for a short range wireless communication signal (for example, an NFC signal) and an operation of identifying whether an event (for example, an event of the cover) is generated. The electronic device may identify an event set to transmit/receive data to/from the cover in a standby mode state through a short range wireless communication connection. The electronic device may perform a wireless signal operation (for example, NFC signal search) in the standby mode state.

The electronic device may identify whether an event of the cover is generated in operation 805. When the event of the cover is not generated, the electronic device may proceed to operation 803 and perform the standby mode operation.

When the event of the cover is generated based on a result of the identification of operation 805, the electronic device performs operation 807.

In operation 807, the electronic device may transmit a wireless power signal to the cover and, when the cover receiving power is driven by the transmitted wireless power signal, perform a short range wireless communication connection with the cover. Further, the electronic device may authenticate the cover by using authentication information (for example, identification information) received from the cover when the short range wireless communication connection with the cover is performed.

When the electronic device is connected to the cover through the short range wireless communication, the electronic device may transmit information on the generated event (hereinafter, referred to as event information) to the cover through the short range wireless communication in operation 809.

In operation 811, the electronic device may identify whether event information is completely displayed on the cover. According to various embodiments, the electronic device may use a tag signal and, when a tag signal includes information indicating that the event information is completely displayed as the event information is completely displayed on the cover, may identify that the operation of the cover is completed, that is, the event information is completely displayed. According to various embodiments, the electronic device may transmit the event information to the cover and, when a predetermined time passes, determine that the operation of the cover is completed based on the event information. The completion of the operation of the cover may be identified according to various embodiments in addition to the above embodiments.

When the operation of the cover is not completed based on a result of the identification of operation 811, the electronic device may continuously identify whether the operation of the cover is completed. When the operation of the cover is completed, the electronic device may perform operation 813.

In operation 813, as the operation of the cover is completed, the electronic device may release the NFC connection with the cover, switch to the standby mode, and then perform operation 803 again.

Next, an operation procedure of the cover that performs short range communication with the electronic device through the operation procedure illustrated in FIG. 8 will be described with reference to the drawings.

Figure 9:
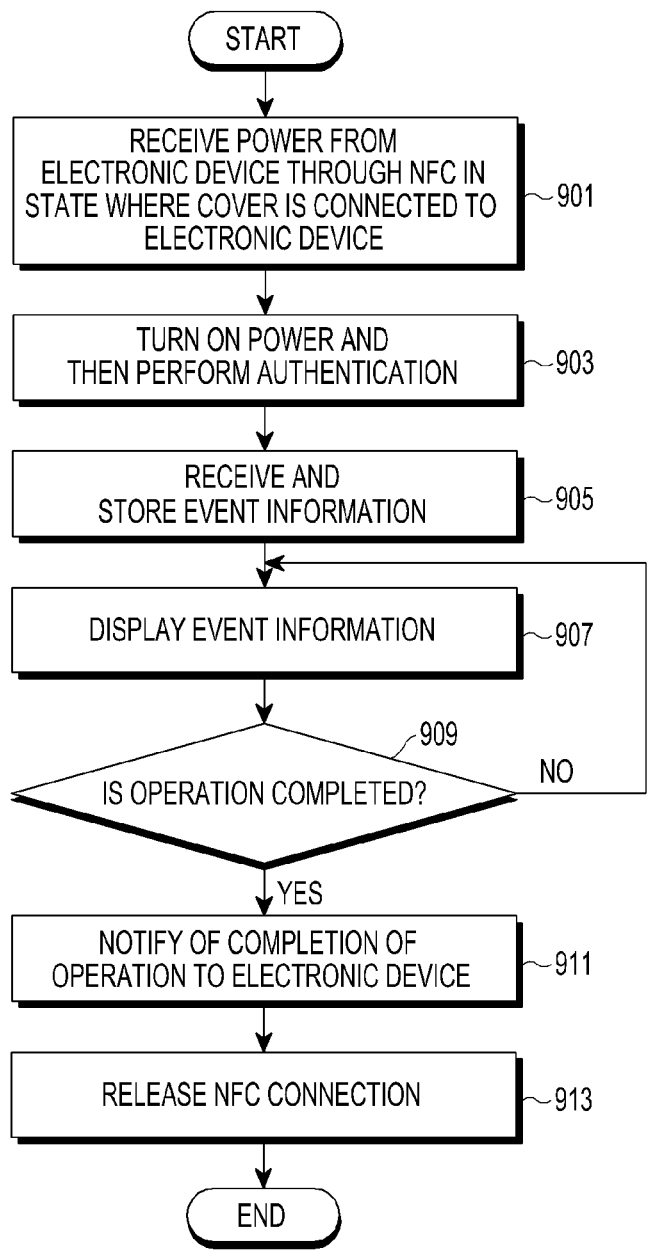
FIG. 9 illustrates an example of an operation procedure of the electronic device according to various embodiments of the present disclosure.

FIG. 9 illustrates an example of an operation procedure of the cover according to various embodiments of the present disclosure.

Referring to FIG. 9, when an event is generated in a state where the cover (for example, the electronic device 102 or 104 of FIG. 1, the electronic device 210 of FIG. 2, the cover 320 of FIG. 3, or the cover 410 of FIG. 4) is connected to the electronic device (for example, the electronic device 101 of FIG. 1, the electronic device 210 of FIG. 2, or the electronic device 310 of FIG. 3), the cover may receive power from the electronic device through NFC in operation 901. According to various embodiments, when the cover receives a power signal from the electronic device, an induced current is generated in an NFC antenna and the cover may receive power and, when power is supplied for a predetermined time, power is applied to internal modules and the internal modules may be driven.

When power is supplied and thus the cover initiates the operation, the cover may transmit information for performing an authentication to the electronic device and transmit/receive information related to the authentication to perform the authentication of the cover in operation 903.

When the authentication is completed and an NFC connection procedure for transmitting/receiving data is completed, the cover may receive event information from the electronic device and store the received event information in a memory in operation 905.

In operation 907, the cover may display the received event information.

In operation 909, the cover may identify whether the operation for displaying the event information is completed. When the operation is not completed based on a result of the identification, the cover may continuously perform operation 907. When the operation is completed, the cover may perform operation 911. According to various embodiments, the cover may identify control information received together with the event information from the electronic device, display the event information for a predetermined time included in the control information, and complete the operation. According to various embodiments, when the previously displayed information such as an electronic ink display (EPD) is maintained, the cover may identify that the operation is completed as an update to the received event information is completed. According to various embodiments, the cover may identify that the operation is completed after a last frame among frames of the received event information is displayed or a predetermined time passes after the last frame is displayed.

In operation 911, the cover may identify that the operation is completed and transmit a signal that notifies the completion of the operation to the electronic device. According to various embodiments, the cover may insert information indicating the completion of the operation into a tag signal and transmit the tag signal to the electronic device. According to various embodiments, the cover may transmit a separate signal that notifies of the completion of the operation through NFC. According to various embodiments, when cover completes the operation control information received from the electronic device, the cover may not perform operation 911 or may transmit a response signal corresponding to the control information.

In operation 913, the NFC connection may be released as the cover identifies the completion of the operation. According to various embodiments, the cover may maintain the supply of wireless power even though the NFC connection is released. According to various embodiments, the cover may supply power to the display for a predetermined time even through the wireless power signal is not received from the electronic device as the NFC connection is released. According to various embodiments, the cover may release the NFC connection of the main antenna and receive power for performing the operation through the sub antenna.

After operation 913, the cover may complete the operation for performing a predetermined function such as a display operation and turn off the device as the NFC connection is released.

An operation procedure of the electronic device will be described when the coupling of the cover to the electronic device is recognized after driving of the electronic device is initiated (woken up) before the operation procedures of the electronic device and the cover described above are performed.

Figure 10:
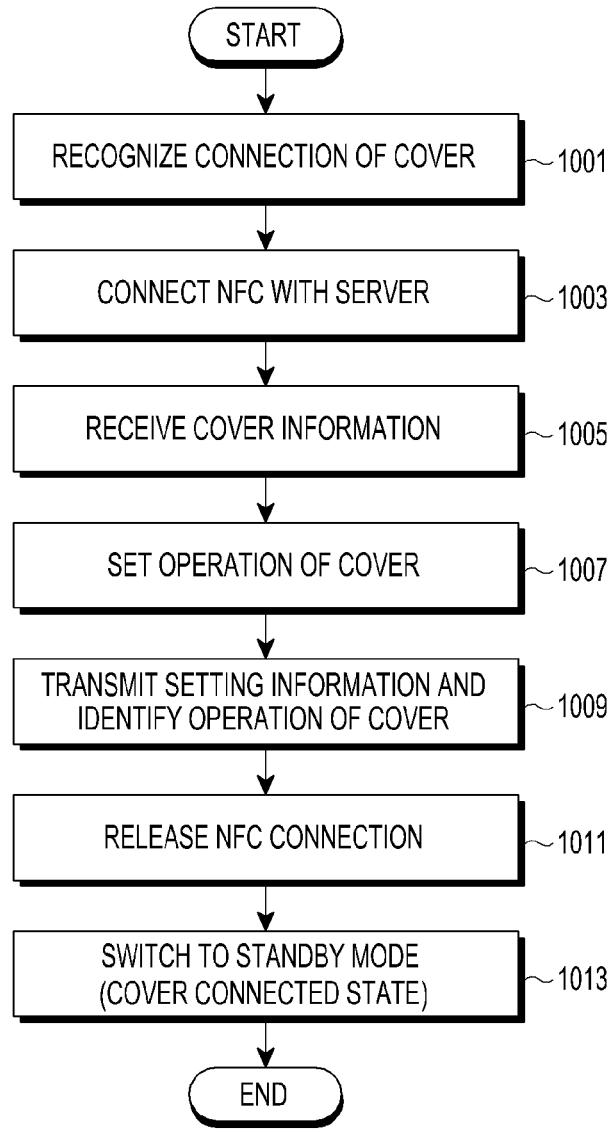
FIG. 10 illustrates an example of an operation procedure of the electronic device according to various embodiments of the present disclosure.

FIG. 10 illustrates an operation process of the electronic device according to various embodiments of the present disclosure.

Referring to FIG. 10, when the cover (the electronic device 102 of FIG. 1, the cover 220 of FIG. 2, the cover 320 of FIG. 3, or the cover 410 of FIG. 4) may be connected to the housing of the electronic device (for example the electronic device 101 of FIG. 1, the electronic device 210 of FIG. 2, or the electronic device 310 of FIG. 3), power is supplied, and driving of the electronic device is initiated (woken up), the electronic device may recognize the connected cover in operation 1001. According to various embodiments, as the electronic device detects an NFC signal generated by the connected cover, the electronic device may recognize the cover. According to various embodiments, the electronic device may recognize the coupling of the cover through a sensor included in the electronic device. According to various embodiments, when a connector of the housing is electrically connected to a connector of the cover, the electronic device may recognize the coupling of the cover.

In operation 1003, when the electronic device identifies the coupling state of the cover, the electronic device may connect NFC with the cover. According to various embodiments, when an NFC polling scheme is used, the electronic device may search for the cover in a predetermined time interval of the polling period and recognize the cover. When the cover is recognized, the electronic device may transmit a wireless power signal and connect NFC with the cover as the cover is driven.

When the NFC is connected, the electronic device may serve as a reader and read cover information from the cover in operation 1005. In operation 1007, the electronic device may set a cover operation by using the read cover information. The setting of the cover operation may include an execution of a corresponding application and a setting of at least one of notification information, an operation time, and an operation method through the executed application.

In operation 1009, the electronic device may transmit setting information according to a dynamic setting to the cover and identify the operation of the cover.

After the electronic device identifies the operation of the cover or a predetermined time passes, the electronic device may release NFC in operation 1011 and switch to the standby mode in operation 1013. For an NFC connection with another NFC device regardless of the cover in the state where the electronic device is connected to the cover, the electronic device may release the NFC connection with the electronic device and search for an NFC signal.

As described above, when the electronic device switches to the standby mode and an event of the cover is generated in a state where the standby mode state is maintained in operation 1011, the electronic device may perform the operation procedure as illustrated in FIG. 8.

A detailed operation procedure of a method for short range wireless communication will be described according to the operation procedure of the electronic device described in FIG. 8, 9, or 10 with reference to the accompanying drawings.

Figure 11:
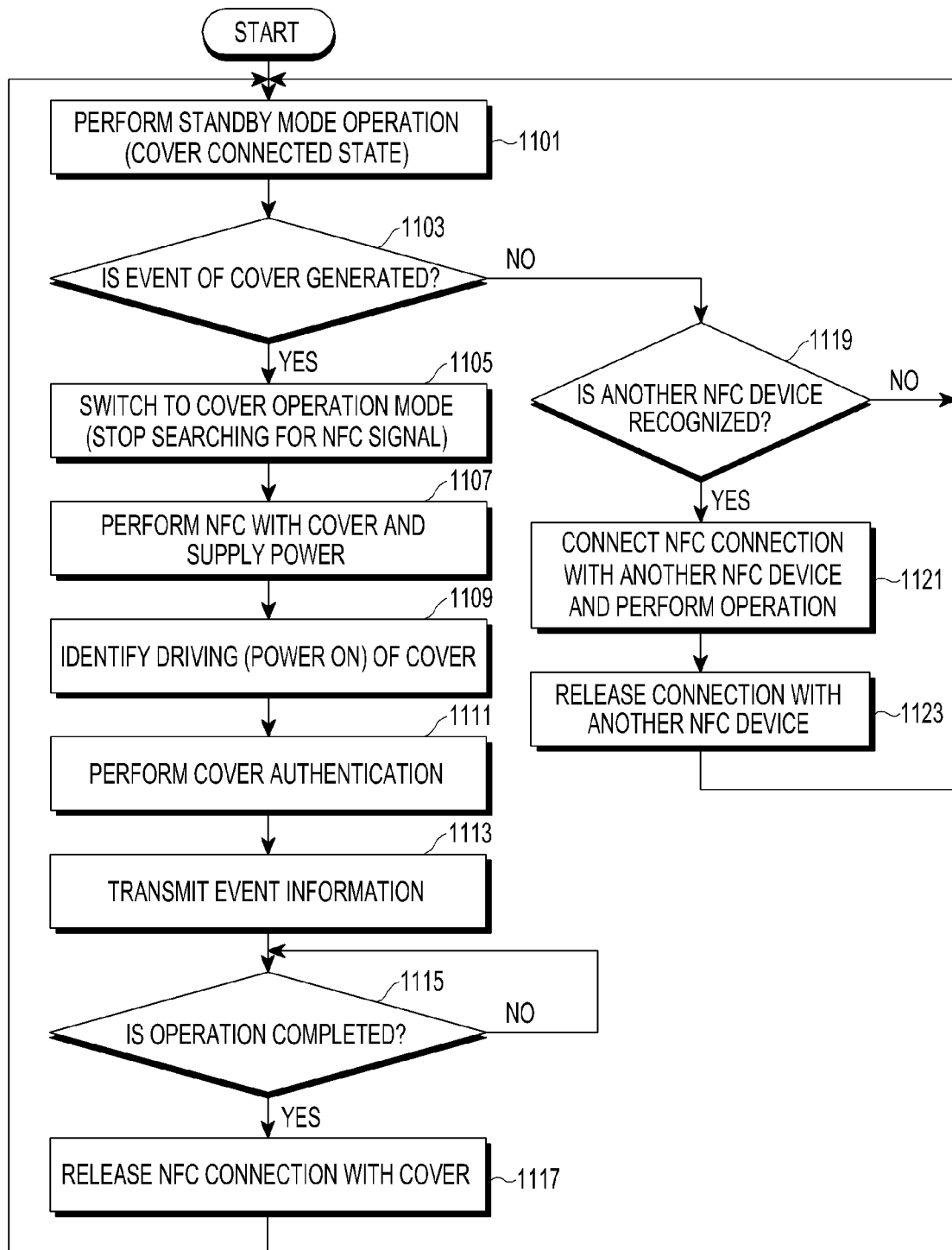
FIG. 11 illustrates an example of an operation procedure of the electronic device according to various embodiments of the present disclosure.

FIG. 11 illustrates an operation procedure of the electronic device according to various embodiments of the present disclosure.

Referring to FIG. 11, the electronic device (for example, the electronic device 101 of FIG. 1, the electronic device 210 of FIG. 2, or the electronic device 310 of FIG. 3) according to various embodiments of the present disclosure may perform a standby mode operation in a state where the electronic device is connected to the cover (for example, the cover 220 of FIG. 2, the cover 320 of FIG. 3, or the cover 410 of FIG. 4) in operation 1101. The electronic device may periodically perform an NFC signal search operation in the standby mode state. According to various embodiments, the electronic device may periodically search for an NFC signal by applying an NFC polling scheme.

In operation 1103, the electronic device may identify whether an event (for example, an event of the cover) is generated in the standby mode. When the event is not generated in the cover based on a result of the identification, the electronic device may perform operation 1119. When the event is generated in the cover based on the result of the identification, the electronic device may perform operation 1105.

In operation 1105, the electronic device switches to a cover operation mode in the standby mode state and stop the NFC signal search operation.

In operation 1107, the electronic device may transmit a wireless power signal to the cover and identify whether the cover having received power is driven by the transmitted wireless power signal.

In operation 1109, when the electronic device identifies driving of the cover, the electronic device may perform a procedure for an NFC connection. When the electronic device performs NFC connection with the cover, the electronic device may perform a cover authentication based on authentication information (for example, identification information) received from the cover in operation 1111.

When the NFC is connected between the electronic device and the cover, the electronic device may transmit information related to the generated event (hereinafter, referred to as event information) to the cover through the NFC in operation 1113.

In operation 1115, the electronic device may identify whether an operation for displaying the event information on the cover is completed. According to various embodiments, the electronic device may use a tag signal and, when a tag signal includes information indicating that the event information is completely displayed as the event information is completely displayed on the cover, may identify that the operation of the cover is completed, that is, the event information is completely displayed. According to various embodiments, the electronic device may transmit the event information to the cover and, when a predetermined time passes, determine that the operation of the cover is completed based on the event information. The completion of the operation of the cover may be identified according to various embodiments in addition to the above embodiments.

When the operation of the cover is not completed based on a result of the identification of operation 1115, the electronic device may continuously identify whether the operation of the cover is completed. When the operation of the cover is completed, the electronic device may perform operation 1117.

In operation 1117, as the operation of the cover is completed, the electronic device may release the NFC connection with the cover, switch to the standby mode, and then perform operation 1101 again.

In operation 1119, the electronic device may identify whether another NFC device is recognized in the standby mode state. When the other NFC device is not identified based on a result of the identification, the electronic device may continuously perform the standby mode operation in operation 1101. When the other NFC device is recognized based on the result of the identification, the electronic device may connect NFC with the other recognized NFC device in operation 1121.

When a predetermined time passes or the particular operation is completed, the electronic device may release the NFC connection with the other NFC device in operation 1123, switch to the standby mode, and periodically perform the NFC signal search operation again in operation 1101.

Figure 12:
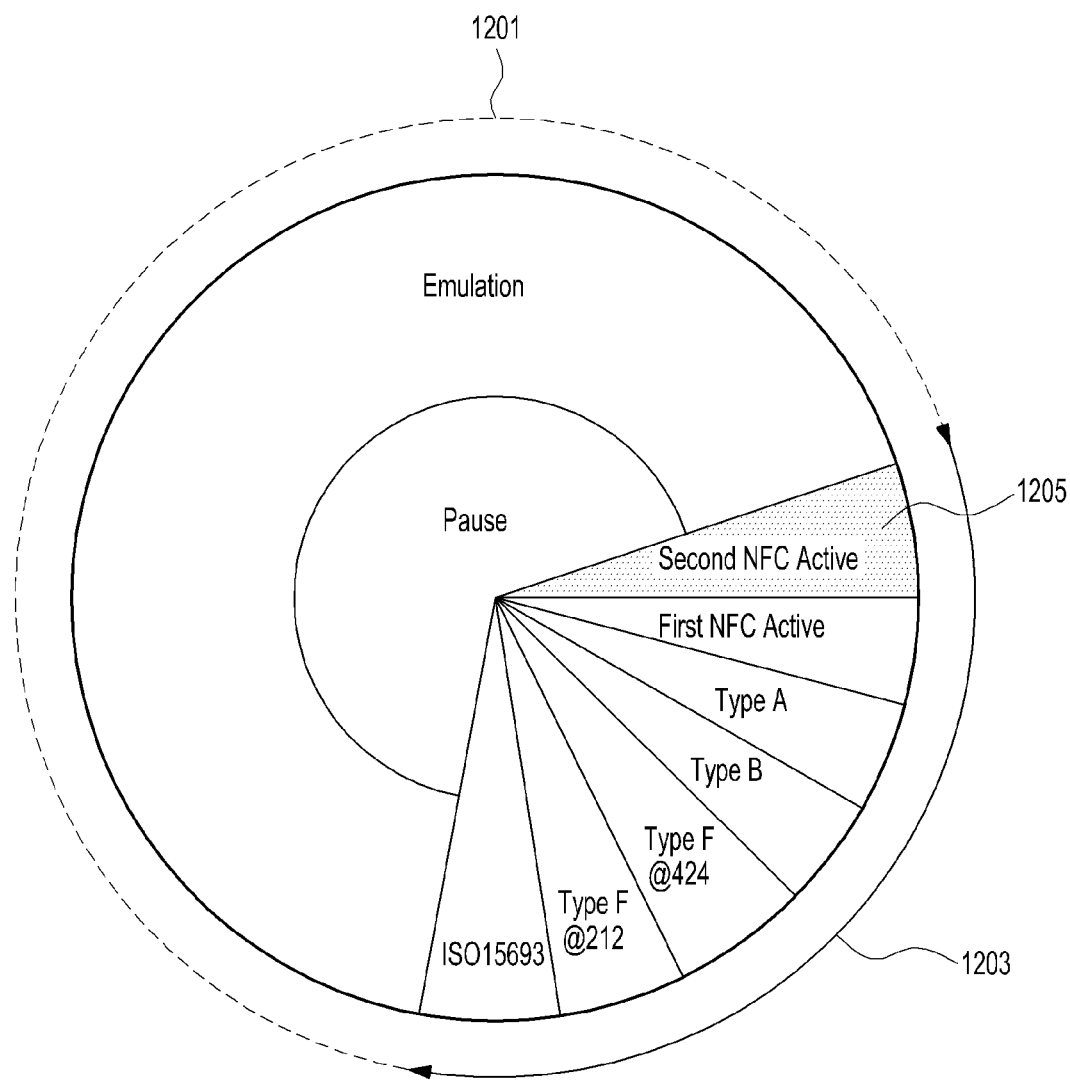
FIG. 12 illustrates an example of an operation of the electronic device in a standby mode according to various embodiments of the present disclosure.

FIG. 12 illustrates an example of an operation of the electronic device in a standby mode according to various embodiments of the present disclosure.

According to various embodiments of the present disclosure, when performing operation 1101 of FIG. 11, the electronic device may periodically search for the NFC signal by applying the NFC polling scheme.

Referring to FIG. 12, the electronic device may serve as a reader, divide a time interval of a search period (for example, an NFC polling period) according to each of NFC types, and search for an external device (an NFC device) corresponding to the corresponding NFC type in the set time interval. According to various embodiments, the polling period may be largely divided into an NFC passive communication interval 1201 and an NFC active communication interval 1203, and the NFC active communication interval 1203 may include divided slots according to an external device existing outside. A slot 1205 (for example, a second NFC active type time interval) may be set in the NFC active communication interval 1203 and, accordingly, the electronic device may search for the cover for a preset time in accordance with the cover. The NFC passive communication interval 1201 is an interval in which data is transmitted in a load modulation scheme through an electromagnetic field provided by a reader (not shown). Further, the NFC active communication interval 1203 is an interval in which the terminal directly generates a magnetic field and transmits data carried on the corresponding magnetic field, and may use a scheme for selecting the corresponding slot according to an NFC device existing outside.

Figure 13:
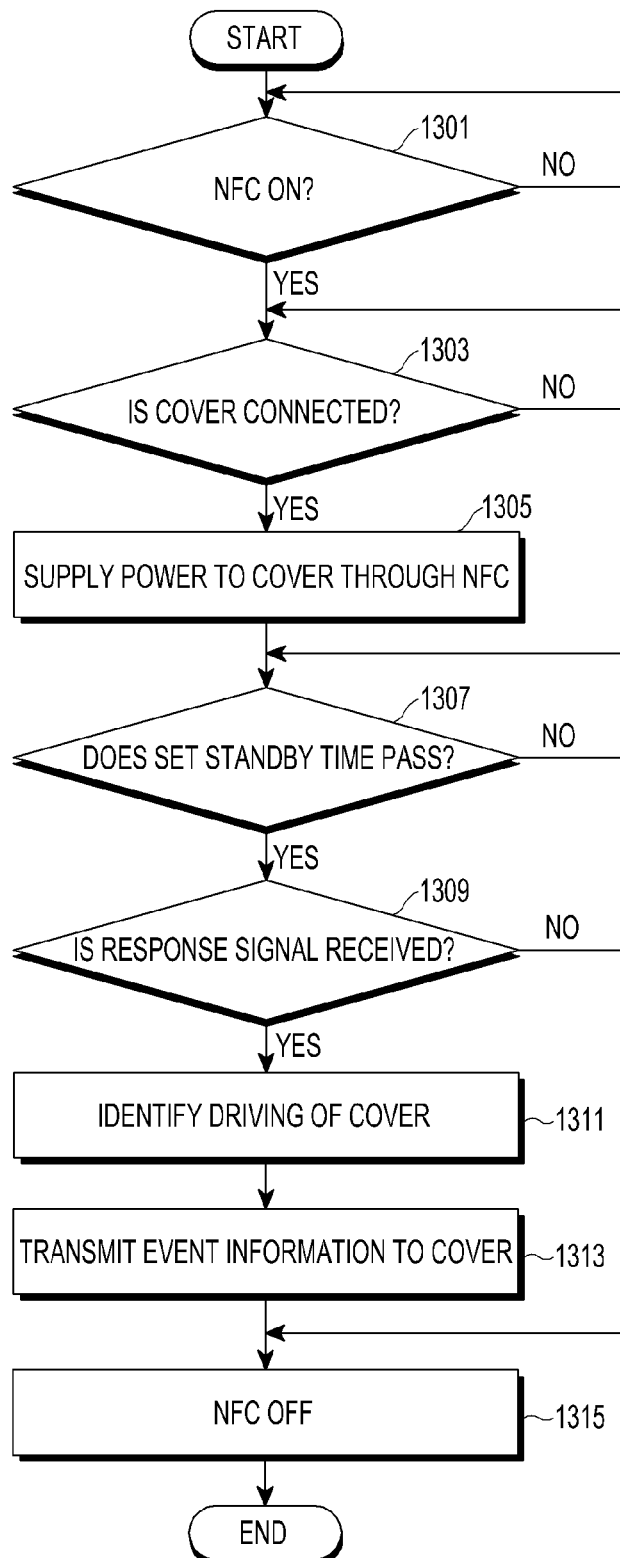
FIG. 13 illustrates an example of an operation procedure of the electronic device according to various embodiments of the present disclosure.

FIG. 13 illustrates an example of an operation procedure of the electronic device according to various embodiments of the present disclosure.

Referring to FIG. 13, in operation 1301, the electronic device (for example, the electronic device 101 of FIG. 1, the electronic device 210 of FIG. 2, or the electronic device 310 of FIG. 3) may identify whether a module for NFC is in an on state (NFC is turned on).

When an NFC function is executed, the electronic device may identify whether the cover (for example, the cover 220 of FIG. 2, the cover 320 of FIG. 3, or the cover 410 of FIG. 4) is recognized through coupling of the cover to the electronic device or whether an event related to the cover is generated in a state where the cover is connected in operation 1303.

When the cover is not connected or the event is not generated in the state where the cover is connected based on a result of the identification of operation 1303, the electronic device may perform operation 1303 again. According to various embodiments, when the event is not generated in the state where the cover is connected, the electronic device may identify an approach of another NFC device and, when the other NFC device approaches, connect NFC with the other NFC device.

When the cover is connected or the event is generated in the state where the cover is connected based on the result of the identification of operation 1303, the electronic device may perform operation 1305.

In operation 1305, the electronic device may supply power by transmitting a wireless power signal to the cover through an NFC scheme. At this time, the electronic device is in a state where the NFC is not connected with the cover and may perform an NFC connection with another NFC device for a predetermined time according to the approach of the other NFC device. Accordingly, in operation 1307, the electronic device may identify the elapse of a preset standby time. That is, the electronic device may identify that the preset standby time passes after the cover receives power and thus is driven (power is turned on). The electronic device may continuously perform operation 1307 when the preset standby time does not pass based on a result of the identification, and perform operation 1309 when the preset standby time passes. At this time, according to various embodiments, the electronic device may identify whether another NFC device approaches before receiving a response signal in a state where a predetermined time does not pass. For example, when the NFC is connected with the cover through the coupling of the cover to the electronic device, the electronic device may communicate with an NFC device for payment, that is, another NFC device for a preset standby time as the NFC device approaches and the NFC with the cover may wait for the preset standby time or be ignored, so that the electronic device may perform NFC with the cover after the preset standby time passes. In operation 1309, the electronic device may identify whether a response signal is received from the cover. The cover may wait for a preset standby time after power is turned on and then respond. Accordingly, even though the cover is connected or the event is generated, the electronic device may connect the NFC after a predetermined time instead of immediately connecting the NFC with the cover and search for another NFC device.

When the response signal is not received based on a result of the identification of operation 1309, the electronic device may stop supplying power to the cover in operation 1315.

When the response signal is received based on the result of the identification of operation 1309, the electronic device may perform operation 1311.

In operation 1311, the electronic device may identify driving of the cover and perform an NFC connection procedure with the cover.

When the NFC is connected with the cover, the electronic device may transmit event information to the cover and identify whether an operation according to the event information is completed in operation 1313.

When the operation of the cover is completed or after a predetermined time passes, the electronic device may release the NFC connection (turn off NFC) and terminate the operation in operation 1315.

According to various embodiments, for example, when the NFC module maintains an off state and then periodically wakes up (on) when an event is generated or in order to search for NFC, the electronic device may perform the operation procedure of FIG. 13.

Hereinafter, a method of performing NFC in consideration of a case where a wireless charging operation is performed based on the operation of the electronic device according to various embodiments of the present disclosure described in FIGS. 8 to 13 will be described.

Figure 14:
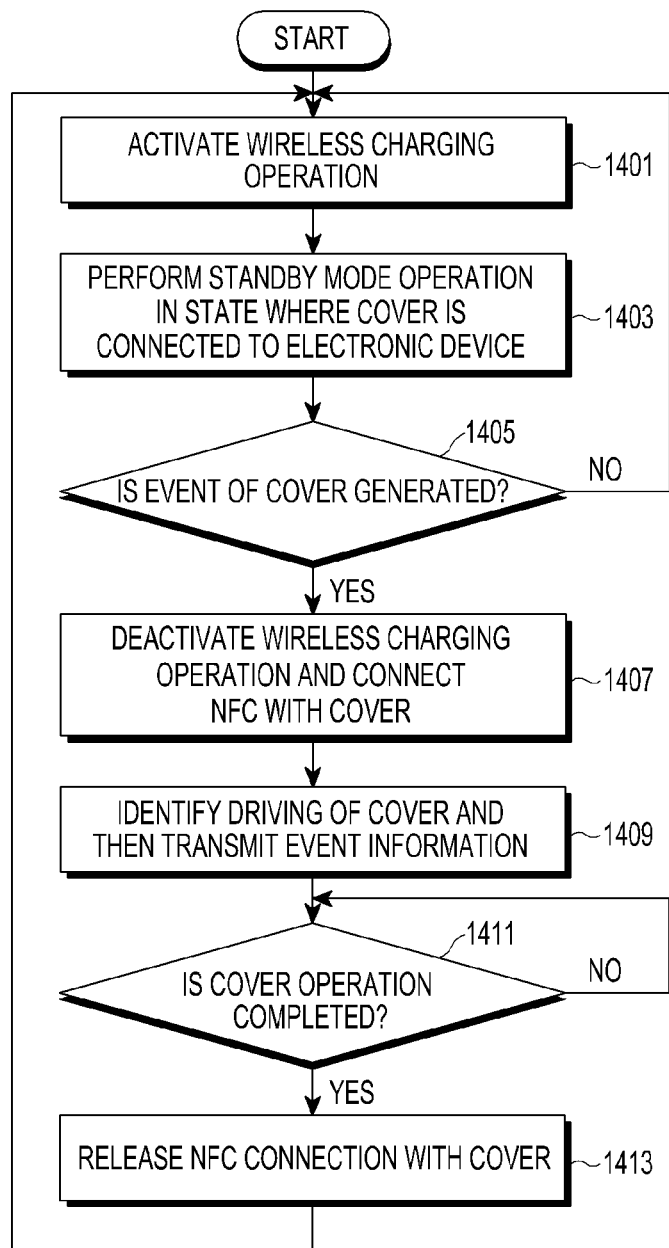
FIG. 14 illustrates an example of an operation procedure of the electronic device according to various embodiments of the present disclosure.

FIG. 14 illustrates an example of an operation procedure of the electronic device according to various embodiments of the present disclosure.

Referring to FIG. 14, according to various embodiments of the present disclosure, in operation 1401, the electronic device (for example, the electronic device 101 of FIG. 1, the electronic device 210 of FIG. 2, or the electronic device 310 of FIG. 3) may activate a wireless charging operation and supply wireless power supplied through an antenna for wireless charging to a battery. In the wireless charging operation, the electronic device may identify whether the cover (for example, the cover 220 of FIG. 2, the cover 320 of FIG. 3, or the cover 410 of FIG. 4) is connected to the housing.

The electronic device may recognize a coupling state of the cover, and perform a setting operation according to the coupling of the cover or identify a set event to transmit/receive data through an NFC with the cover in a standby mode state. The electronic device may perform an NFC signal search operation in the standby mode state. Accordingly, the electronic device is currently in a state where the cover is connected and may perform a standby mode operation in the standby mode state in operation 1403. The standby mode operation may include at least one of an operation of periodically searching for an NFC signal and an operation of identifying whether an event (for example, an event of the cover) is generated.

The electronic device may identify whether the event is generated in the cover in operation 1405. When the event is not generated in the cover, the electronic device may continuously perform the wireless charging operation in operation 1401 and maintain the standby mode state.

When the event of the cover is generated based on the result of the identification of operation 1405, the electronic device performs operation 1407.

In operation 1407, when transmitting a wireless power signal to the cover, the electronic device may deactivate the wireless charging operation in order to prevent interference by wireless charging. Further, the electronic device may connect NFC with the cover and supply power to the cover. When performing the NFC connection with the cover, the electronic device may perform a cover authentication based on authentication information (for example, identification information) received from the cover.

In operation 1409, as the electronic device connects the NFC with the cover, the electronic device may transmit a wireless signal including event information on the generated event to the cover through the NFC.

In operation 1411, the electronic device may identify whether event information is completely displayed on the cover. According to various embodiments, the electronic device may use a tag signal and, when a tag signal includes information indicating that the event information is completely displayed as the event information is completely displayed on the cover, may identify that the operation of the cover is completed, that is, the event information is completely displayed. According to various embodiments, the electronic device may transmit the event information to the cover and, when a predetermined time passes, determine that the operation of the cover is completed based on the event information. The completion of the operation of the cover may be identified according to various embodiments in addition to the above embodiments.

When the operation of the cover is completed based on a result of the identification of operation 1411, the electronic device may continuously identify whether the operation of the cover is completed and, when the operation of the cover is completed, may perform operation 1413.

In operation 1413, as the operation of the cover is completed, the electronic device may release the NFC connection with the cover, switch to the standby mode, and then perform operation 1401 again.

According to various embodiments of the present disclosure, when electronic device may not perform operations 1411 and 1413 and completely transmits the event information, the electronic device activates the wireless charging operation again in operation 1401.

According to various embodiments of the present disclosure, the electronic device may perform the cover mode operation through NFC identically to the operation procedure of FIG. 14, but may not deactivate the wireless charging operation and may lower wireless charging transmission power (Tx power) in operation 1407 when switching to the cover mode or the event is generated. Further, when the operation is completed, the electronic device may not release the NFC, and may increase transmission power for wireless charging and perform the wireless charging operation in operation 1401 in a state where the NFC connection is maintained.

A method of short range wireless communication in an electronic device according to one of various embodiments of the present disclosure may include an operation of, when a cover is connected to the electronic device, determining generation of an event related to the cover, an operation of, when the event is generated, an operation of supplying power to the cover through wireless communication, an operation of, when the cover is driven by the supplied power, transmitting event information to the cover through the short range wireless communication to display the information related to the generated event on the cover, and an operation of, when an operation of the cover according to the event is completed, switching to a standby mode after releasing a short range wireless communication connection with the cover.

According to various embodiments of the present disclosure, the operation of transmitting the event information to the cover may include an operation of not recognizing another external device while the event information is transmitted to the cover.

According to various embodiments of the present disclosure, an operation in the standby mode may include an operation for searching for the cover during a time interval of a search period corresponding to the cover and, when the time interval corresponding to the cover passes, searching for another external device corresponding to another time interval of the search period.

According to various embodiments of the present disclosure, the operation of switching to the standby mode may include an operation of transmitting the information related to the event to the cover for the time interval of a search period corresponding to the cover, an operation of, when the time interval corresponding to the cover set in accordance with the cover passes and the other time interval is selected, determining that the operation of the cover is completed, and an operation of switching to the standby mode as the operation of the cover is completed.

According to various embodiments of the present disclosure, the operation of switching to the standby mode may include an operation of, even when the connection of the short range wireless communication with the cover is released, maintaining the power supplied to the cover for a preset time by using a routine different from a routine for connecting the short range wireless communication.

According to various embodiments of the present disclosure, the operation of switching to the standby mode may include an operation of calculating an operation time of the cover by analyzing the information related to the event, an operation of, when the calculated operation time passes, determining that the operation of the cover is completed, and an operation of switching to the standby mode as the operation of the cover is completed.

According to various embodiments of the present disclosure, the operation of switching to the standby mode may include an operation of, when a tag signal including information indicating the completion of the operation is received from the cover, determining that the operation of the cover is completed, and an operation of switching to the standby mode as the operation of the cover is completed.

According to various embodiments of the present disclosure, the method may further include an operation of, when the electronic device releases the connection of the short range wireless communication with the cover, switches to the standby mode, and performs an operation in the standby mode, if another external device is not recognized, maintaining the power supplied to the cover for a preset standby time.

According to various embodiments of the present disclosure, the method may further include an operation of, when the cover is driven, receiving authentication information of the cover and performing an authentication.

Figure 15:
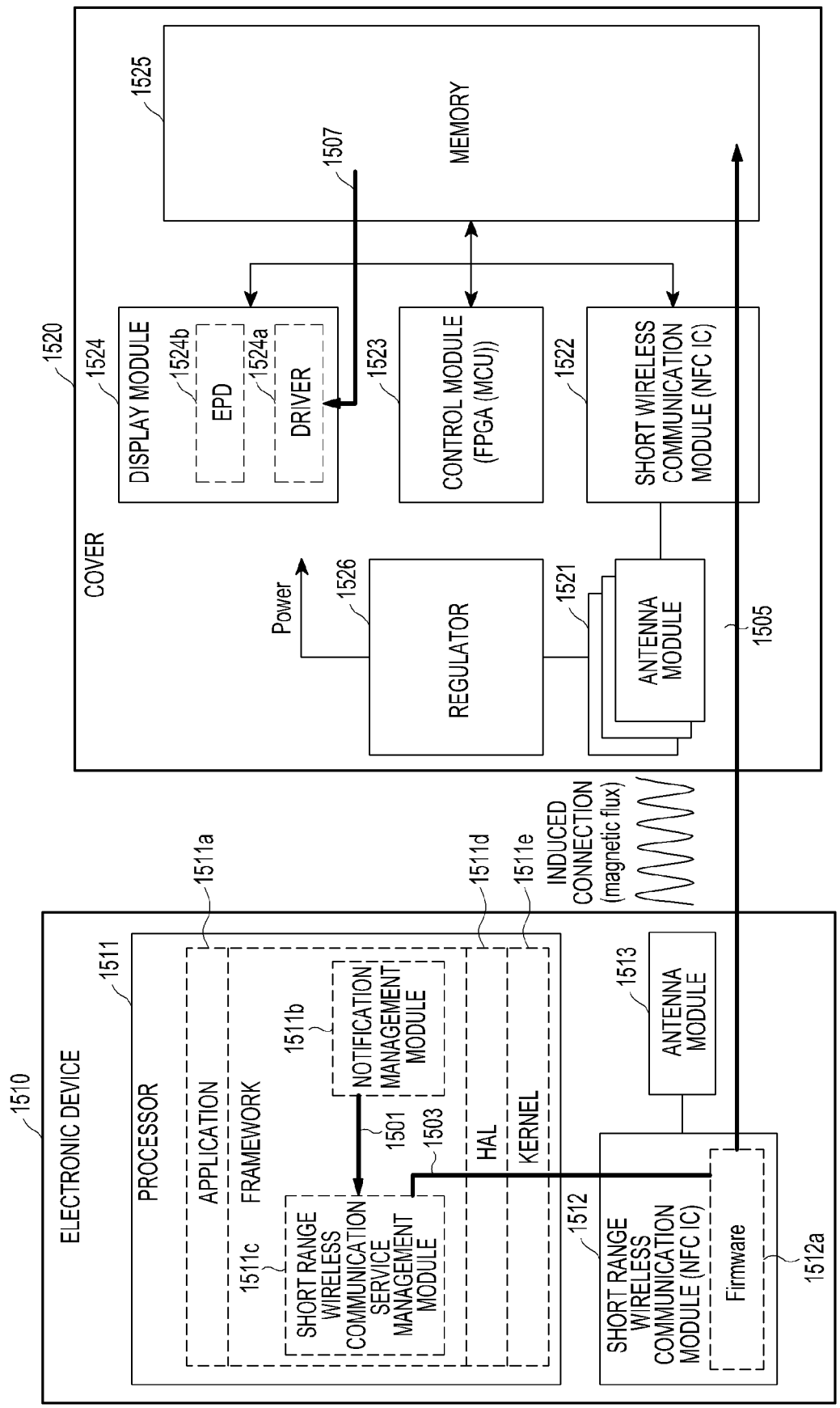
FIG. 15 illustrates an example of a configuration of an electronic device according to various embodiments.

FIG. 15 illustrates an example of a configuration of an electronic device according to various embodiments.

Referring to FIG. 15, according to various embodiments of the present disclosure, an electronic device 1510 (for example, the electronic device 101 of FIG. 1 or the electronic device 210 of FIG. 2) may be linked with an accessary device (hereinafter, referred to as a cover 1520) through short range wireless communication.

The electronic device 1510 may include a processor 1511, a short range wireless communication module 1512, and an antenna module 1513.

The processor 1511 (for example, similar or equal to the processor 120 of FIG. 1 or the controller 211 of FIG. 2) may include an application module 1511a, a framework including a short range wireless communication service management module 1511c (for example, an NFC service manager) and a notification management module 1511b, a Hardware Abstraction Layer (HAL) 1511d, or a kernel 1511e.

The application module 1511a (for example, the application program of FIG. 1) may execute various applications which can be executed in the electronic device.

When an event related to the cover 1520 is generated, the notification management module 1511b may transmit an event message including information related to the generated event to the short range wireless communication service management module 1511c.

The short range wireless communication management module 1511c may receive the event message and convert the received event message into a frame data for short range wireless communication (for example, NFC). Further, the short range wireless communication service management module 1511c may enable the short range wireless communication module 1512 and transmit the converted frame data to the short range wireless communication module 1512.

The HAL 1511d (for example, the API 145 of FIG. 1) may be used like the API as a part of the operating system, and may be a set of routines independent details of hardware used for implementing an input/output interface, interrupt control, and multi-processor communication.

The kernel 1511e (for example, the kernel 141 of FIG. 1) may control or manage system resources (for example, the processor 1511, the short range wireless communication module 1512, and/or the antenna module 1513) used for executing an operation or a function implemented in, for example, different programs (for example, applications executed by the application module 1511a). Further, the kernel 1511e may perform at least one of controlling, allocating, and collecting the system resources.

The short range wireless communication module 1512 (for example, similar or equal to the short range wireless communication module 212b of FIG. 2) may include firmware 1512a. The short range wireless communication module 1512 may generate a wireless signal (an RF field or magnetic flux) in the cover 1520 through the antenna module 1513 to be connected to the cover 1520 in a magnetic induction type, and activate the antenna module 1521 of the cover 1520 by the generated wireless signal. Further, the short range wireless communication module 1512 may transmit received short range wireless communication frame data to the cover 1520 through the antenna module 1513. The antenna module 1513 (for example, similar or equal to the antenna module 212a of FIG. 2) may be combined with the antenna module 1521 of the cover 1520 in a magnetic induction type (magnetic induction scheme) for wireless charging of the cover 1520 and also perform the wireless charging of the cover 1520 through, for example, a magnetic resonance scheme or an electromagnetic wave scheme. Further, the antenna module 1513 may include an additional circuit for wireless charging, for example, a coil loop, a resonant circuit, or a rectifier.

According to various embodiments of the present disclosure, the cover 1520 (for example, similar or equal to the cover 220 of FIG. 2) may include the antenna module 1521, a short range wireless communication module 1522, a control module 1523, a display module 1524, a memory 1525, or a regulator 1526.

The antenna module 1521 (for example, similar or equal to the antenna module 221*a* of FIG. 2) may be combined with the electronic device 1510 by the wireless signal (or magnetic field) generated by the antenna module 1513 of the electronic device 1510 in, for example, a magnetic induction type.

The short range wireless communication module 1522 (for example, similar or equal to the short range wireless communication module 221*b* of FIG. 2) may store short range wireless communication frame data received from the electronic device 1510 through the antenna module 1521 in the memory 1525.

The control module 1523 (for example, similar or equal to the controller 222 of FIG. 2) may read the short range wireless communication frame data stored in the memory 1525 and transmit the read short range wireless communication frame data to the display module 1524.

The display module 1524 (for example, similar or equal to the display unit 224 of FIG. 2) may include a driver 1524*a* and a display panel 1524*b* (for example, an ElectroPhoretic Display (EPD)). The driver 1524*a* may make a control to display the transmitted frame data by controlling a voltage applied to the display panel 1524*b*.

The memory 1525 may store the frame data received from the electronic device 1510. Further, the memory 1525 may store a program or data used for a function operation of the cover 1520 according to various embodiments. The memory 1525 may largely include a program area and a data area. The program area may store relevant information for driving of the cover 1520 such as an Operating System (OS) that boots the electronic device. The data area may store transmitted/received data or generated data according to various embodiments. Further, the memory 1525 may include at least one storage medium of a flash memory, a hard disk, a multimedia card micro type memory (for example, an SD or XD memory), a RAM, and a ROM.

The regulator 1526 may output a voltage applied by the magnetic field generated in the electronic device 1510 to be a voltage suitable for each module.

Referring back to FIG. 15, when an event is generated, the notification management module 1511*b* may generate an event message and transmit the generated event message to the short range wireless communication service management module 1511*c* in operation 1501. Accordingly, in operation 1503, the short range wireless communication service management module 1511*c* may convert the received event message into, for example, an NFC type data format and transmit the converted NFC frame data to the short range wireless communication module 1512.

When the short range wireless communication module 1512 of the cover 1520 receives the NFC frame data, the short range wireless communication module 1512 may transmit the received NFC frame data to the cover 1520 through the antenna module 1513 in operation 1505. In operation 1505, the short range wireless communication module 1522 included in the cover 1520 may store the NFC frame data received through the antenna module 1521 in the memory 1525.

In operation 1507, the control module 1523 of the cover 1520 may read display information included in the frame data stored in the memory 1525, transmit the display information to the display module 1524, and display the display information on the display panel 1524*b* (for example, EPD).

FIG. 16 illustrates an example of a memory map according to various embodiments of the present disclosure.

The memory 1525 of the cover 1520 illustrated in FIG. 15 may store the short range wireless communication frame data received from the electronic device. A memory map for storing the received short range wireless communication frame data may include control information 1601 containing information related to a state of a control module, updated date/time information, or information on a frame sequence, and display information 1603 as illustrated in FIG. 16. The display information 1603 may be information related to the electronic device and the generated event and may include information which can be displayed on the display of the cover.

Figure 17:
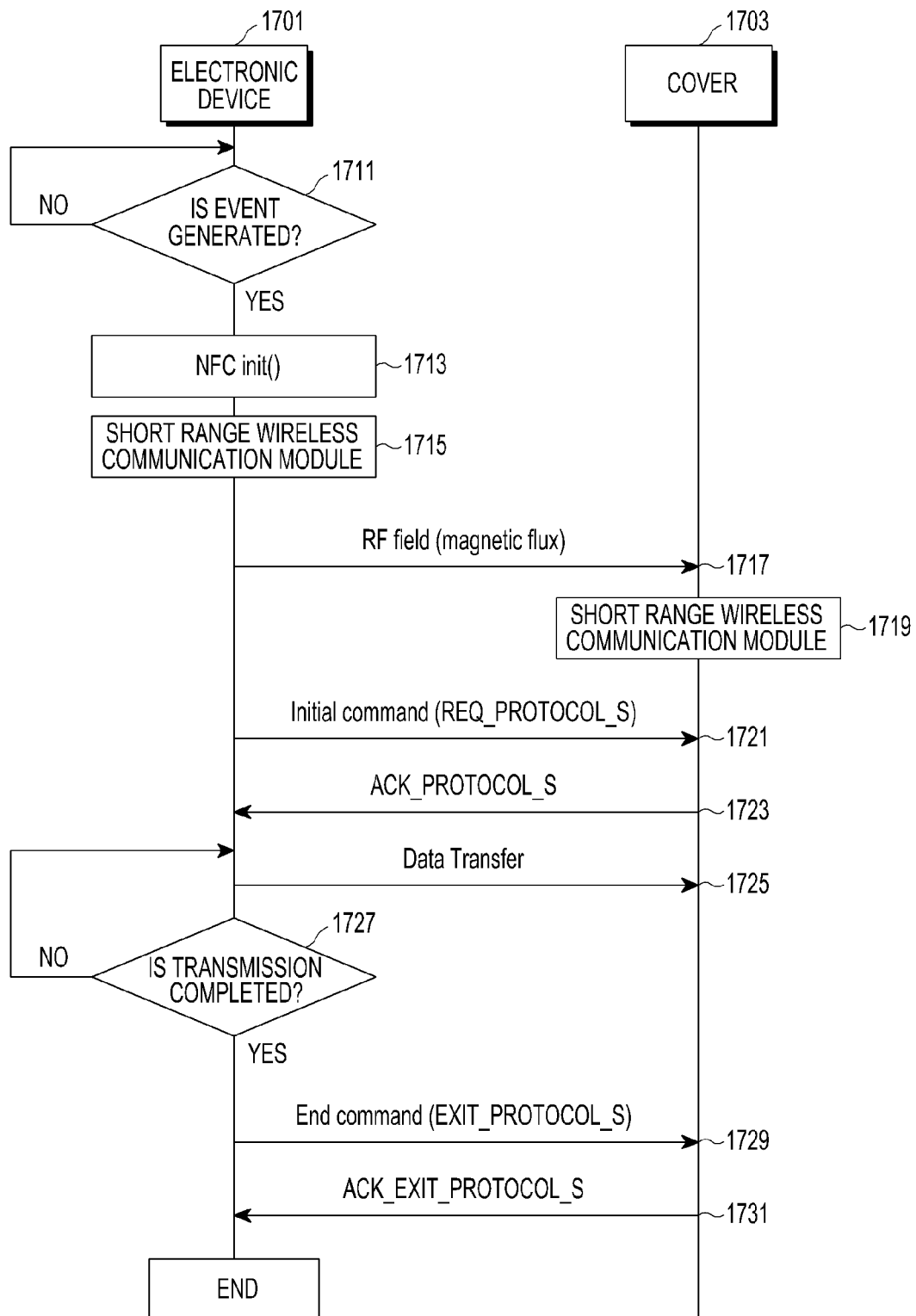
FIG. 17 illustrates an operation procedure of the electronic device according to various embodiments of the present disclosure.

FIG. 17 illustrates an operation procedure of an electronic device according to various embodiments of the present disclosure, and FIG. 18 illustrates an example of a program related to short range wireless communication of the electronic device according to various embodiments of the present disclosure.

Referring to FIG. 17, according to various embodiments of the present disclosure, an electronic device 1701 (for example, the electronic device 1510 of FIG. 15) may identify whether an event related to a cover 1703 is generated in operation 1711. The electronic device may perform operation 1713 when the event is generated based on a result of the identification, and perform operation 1711 again when the event is not generated.

In operation 1713, the electronic device 1701 may start short range wireless communication (for example, NFC). The electronic device 1701 may start short range wireless communication through a program illustrated in FIG. 18.

In operation 1715, the electronic device 1701 may activate the short range wireless communication module (for example, the short range wireless communication module 1512 of FIG. 15) and generate a wireless signal (RF field) (for example, magnetic flux) for wireless charging of the cover 1703.

In operation 1717, the electronic device 1701 may transmit the generated wireless signal to the cover 1703.

In operation 1719, the cover 1703 may perform wireless charging by the received wireless signal and activate the short range wireless communication module by applying wirelessly charged power to the short range wireless communication module (for example, the short range wireless communication module 1522 of FIG. 15). Accordingly, the cover 1703 may be combined with the electronic device in, for example, a magnetic induction type.

In operation 1721, the electronic device 1701 may transmit an initial command message to the cover 1703. The initial command message may include information (REQ_PROTOCOL_S) that makes a request for a protocol for communication with the cover 1703.

In operation 1723, the electronic device 1701 may receive a response message (ACK_RPOTOCOL_S) according to the protocol request from the cover 1703.

In operation 1725, the electronic device 1701 may transmit a data transfer message including event information according to the generation of the event to the cover 1703 by using the received protocol. The event information may be the display information illustrated in FIG. 16 and may be stored in the memory. Accordingly, the cover 1703 may display the received event information on the display.

In operation 1727, the electronic device 1701 may identify whether the display information is completely transmitted. The electronic device 1701 may perform operation 1729 when the event information is completely transmitted based on a result of the identification, and continuously perform operation 1725 when the event information is not completely transmitted.

In operation 1729, the electronic device 1701 may transmit an end command message (EXID_PROTOCOL_S) to the cover 1703.

In operation 1731, the electronic device 1701 may receive a response message (ACK_EXIT_PROTOCOL_S) corresponding to the end command, and end the NFC for transmitting the event information according to the generation of the event as the response message corresponding to the end command is received.

Figure 19:
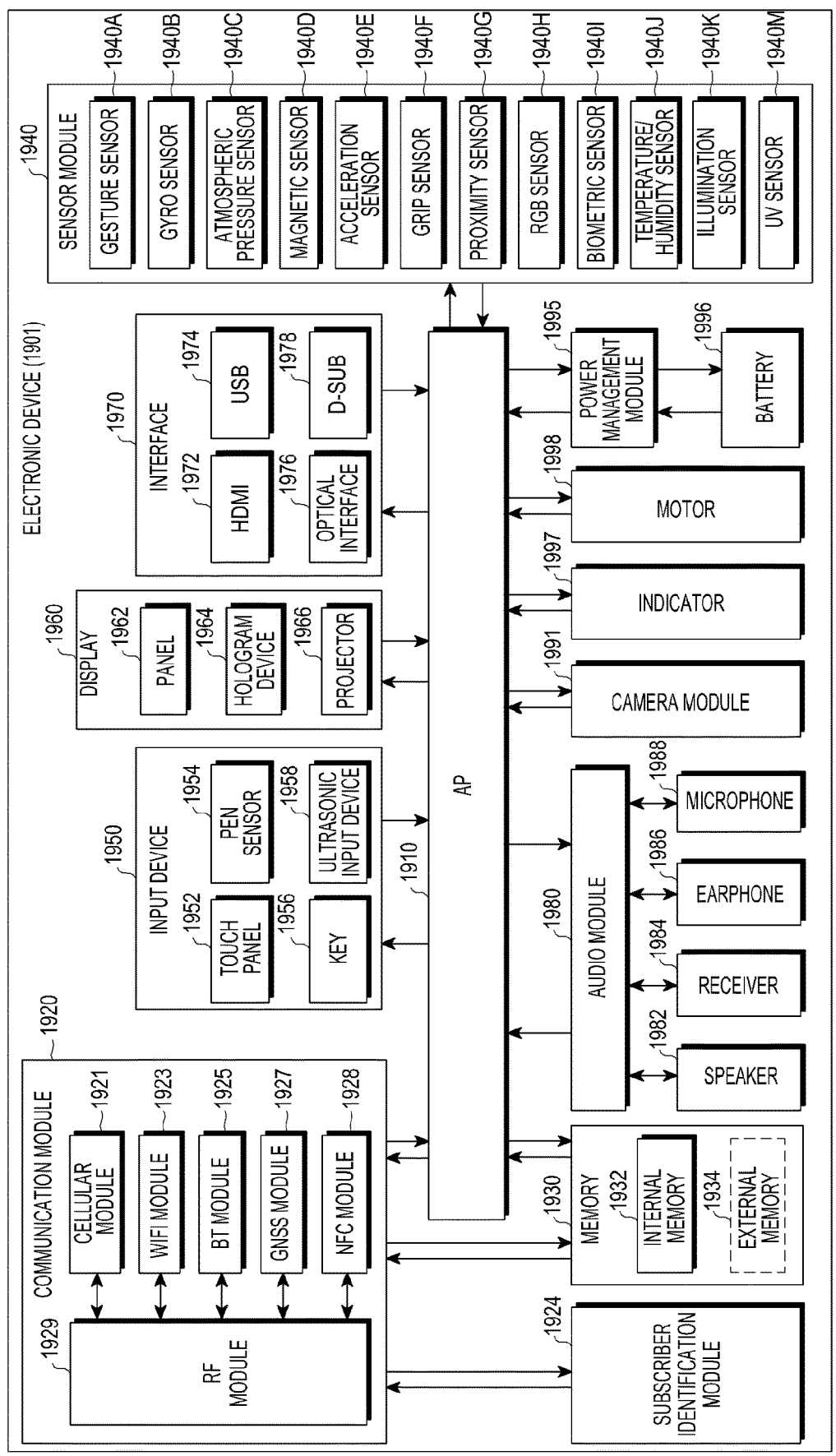
FIG. 19 illustrates a block diagram of an electronic device according to various embodiments.

FIG. 19 illustrates a block diagram of an electronic device according to various embodiments.

Referring to FIG. 19, an electronic device 1901 may include, for example, the entirety or a part of the electronic device 101 illustrated in FIG. 1. The electronic device 1901 may include at least one Application Processor (AP) 1910, a communication module 1920, a Subscriber Identification Module (SIM) 1924, a memory 1930, a sensor module 1940, an input device 1950, a display 1960, an interface 1970, an audio module 1980, a camera module 1991, a power management module 1995, a battery 1996, an indicator 1997, and a motor 1998.

The processor 1910 may control a plurality of hardware or software elements connected to the processor 1910 and may perform various data processing and operations by driving an operating system or an application program. The processor 1910 may be embodied, for example, as a System on Chip (SoC). According to an embodiment, the processor 1910 may further include a Graphic Processing Unit (GPU) and/or an image signal processor. The processor 1910 may also include at least some (for example, a cellular module 1921) of the elements illustrated in FIG. 19. The processor 1910 may load, in a volatile memory, instructions or data received from at least one of the other elements (for example, a non-volatile memory) to process the loaded instructions or data, and may store various types of data in the non-volatile memory.

The communication module 1920 may have a configuration equal or similar to that of the communication interface 170 of FIG. 1. The communication module 1920 may include, for example, a cellular module 1921, a Wi-Fi module 1923, a BT module 1925, a GNSS module 1927 (for example, a GPS module, a Glonass module, a Beidou module, or a Galileo module), an NFC module 1928, and a Radio Frequency (RF) module 1929.

The cellular module 1921 may provide, for example, a voice call, a video call, a text message service, an Internet service, and the like through a communication network. According to an embodiment, the cellular module 1921 may identify and authenticate the electronic device 1901 within a communication network using the subscriber identification module 1924 (for example, a SIM card). According to an embodiment, the cellular module 1921 may perform at least some of the functions that the processor 1910 may provide. According to an embodiment, the cellular module 1921 may include a Communication Processor (CP).

Each of the Wi-Fi module 1923, the BT module 1925, the GNSS module 1927, or the NFC module 1928 may include, for example, a processor for processing data that is transmitted and received through the corresponding module. According to some embodiments, at least some (two or more) of the cellular module 1921, the Wi-Fi module 1923, the BT module 1925, the GNSS module 1927, and the NFC module 1928 may be included in one Integrated Chip (IC) or IC package.

The RF module 1929, for example, may transmit/receive a communication signal (for example, an RF signal). The RF module 1929 may include, for example, a transceiver, a Power Amplifier Module (PAM), a frequency filter, a Low Noise Amplifier (LNA), an antenna, and the like. According to another embodiment, at least one of the cellular module 1921, the Wi-Fi module 1923, the BT module 1925, the GNSS module 1927, and the NFC module 1928 may transmit/receive an RF signal through a separate RF module.

The subscriber identification module 1924 may include, for example, a card that includes a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 1930 (for example, the memory 130) may include, for example, an internal memory 1932 or an external memory 1934. The internal memory 1932 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 1934 may further include a flash drive, for example, a Compact Flash (CF), a Secure Digital (SD), a Micro Secure Digital (Micro-SD), a Mini Secure Digital (Mini-SD), an eXtreme Digital (xD), a Multi-Media Card (MMC), a memory stick, and the like. The external memory 1934 may be functionally and/or physically connected to the electronic device 1901 through various interfaces.

The sensor module 1940 may, for example, measure a physical quantity or detect the operating state of the electronic device 1901 and may convert the measured or detected information into an electrical signal. The sensor module 1940 may include, for example, at least one of a gesture sensor 1940A, a gyro sensor 1940B, an atmospheric pressure sensor 1940C, a magnetic sensor 1940D, an acceleration sensor 1940E, a grip sensor 1940F, a proximity sensor 1940G, a color sensor 1940H (for example, a red, green, blue (RGB) sensor), a biometric sensor 1940I, a temperature/humidity sensor 1940J, a light sensor 1940K, and a ultraviolet (UV) sensor 1940M. Additionally or alternatively, the sensor module 1940 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 1940 may further include a control circuit for controlling one or more sensors included therein. In some embodiments, the electronic device 1901 may further include a processor configured to control the sensor module 1940 as a part of, or separately from, the processor 1910, and may control the sensor module 1940 while the processor 1910 is in a sleep state.

The input device 1950 may include, for example, a touch panel 1952, a (digital) pen sensor 1954, a key 1956, or an ultrasonic input device 1958. The touch panel 1952 may use, for example, at least one of a capacitive type, a resistive type, an infrared type, and an ultrasonic type. Furthermore, the touch panel 1952 may further include a control circuit.

The touch panel 1952 may further include a tactile layer to provide a tactile reaction to a user.

The (digital) pen sensor 1954 may include, for example, a recognition sheet that is a part of, or separate from, the touch panel. The key 1956 may include, for example, a physical button, an optical key, or a keypad. The ultrasonic input device 1958 may detect ultrasonic waves, which are generated by an input tool, through a microphone (for example, a microphone 1988) to identify data corresponding to the detected ultrasonic waves.

The display 1960 (for example, the display 160) may include a panel 1962, a hologram device 1964 or a projector 1966. The panel 1962 may have a configuration that is the same as, or similar to, that of the display 160 illustrated in FIG. 1. The panel 1962 may be implemented to be, for example, flexible, transparent, or wearable. The panel 1962, together with the touch panel 1952, may be implemented as one module. The hologram device 1964 may show a three dimensional image in the air by using an interference of light. The projector 1966 may display an image by projecting light onto a screen. The screen may be located, for example, in the interior of, or on the exterior of, the electronic device 1901. According to an embodiment, the display 1960 may further include a control circuit for controlling the panel 1962, the hologram device 1964, or the projector 1966.

The interface 1970 may include, for example, a High-Definition Multimedia Interface (HDMI) 1972, a Universal Serial Bus (USB) 1974, an optical interface 1976, or a D-subminiature (D-sub) 1978. The interface 1970 may be included, for example, in the communication interface 170 illustrated in FIG. 1. Additionally or alternatively, the interface 1970 may include, for example, a Mobile High-definition Link (MHL) interface, a Secure Digital (SD) card/Multi-Media Card (MMC) interface, or an Infrared Data Association (IrDA) standard interface.

The audio module 1980 may convert, for example, a sound into an electrical signal, and vice versa. At least some elements of the audio module 1980 may be included, for example, in the input/output interface 150 illustrated in FIG. 1. The audio module 1980 may process sound information that is input or output through, for example, a speaker 1982, a receiver 1984, earphones 1986, the microphone 1988, and the like.

The camera module 1991 is a device that can photograph a still image and a moving image. According to an embodiment, the camera module 1991 may include one or more image sensors (for example, a front sensor or a rear sensor), a lens, an Image Signal Processor (ISP), or a flash (for example, an LED or xenon lamp).

The power management module 1995 may manage, for example, the power of the electronic device 1901. According to an embodiment, the power management module 1995 may include a Power Management Integrated Circuit (PMIC), a charger Integrated Circuit (IC), or a battery or fuel gauge. The PMIC may have a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 1996 and a voltage, current, or temperature while charging. The battery 1996 may include, for example, a rechargeable battery and/or a solar battery.

The indicator 1997 may indicate a particular state (for example, a booting state, a message state, a charging state, and the like) of the electronic device 1901 or a part (for example, the processor 1910) thereof. The motor 1998 may convert an electrical signal into a mechanical vibration and may generate a vibration, a haptic effect, and the like. Although not illustrated, the electronic device 1901 may include a processing unit (for example, a GPU) for supporting mobile TV. The processing unit for supporting the mobile TV may process media data according to a standard, such as Digital Multimedia Broadcasting (DMB), Digital Video Broadcasting (DVB), MediaFlo™, and the like.

Figure 20:
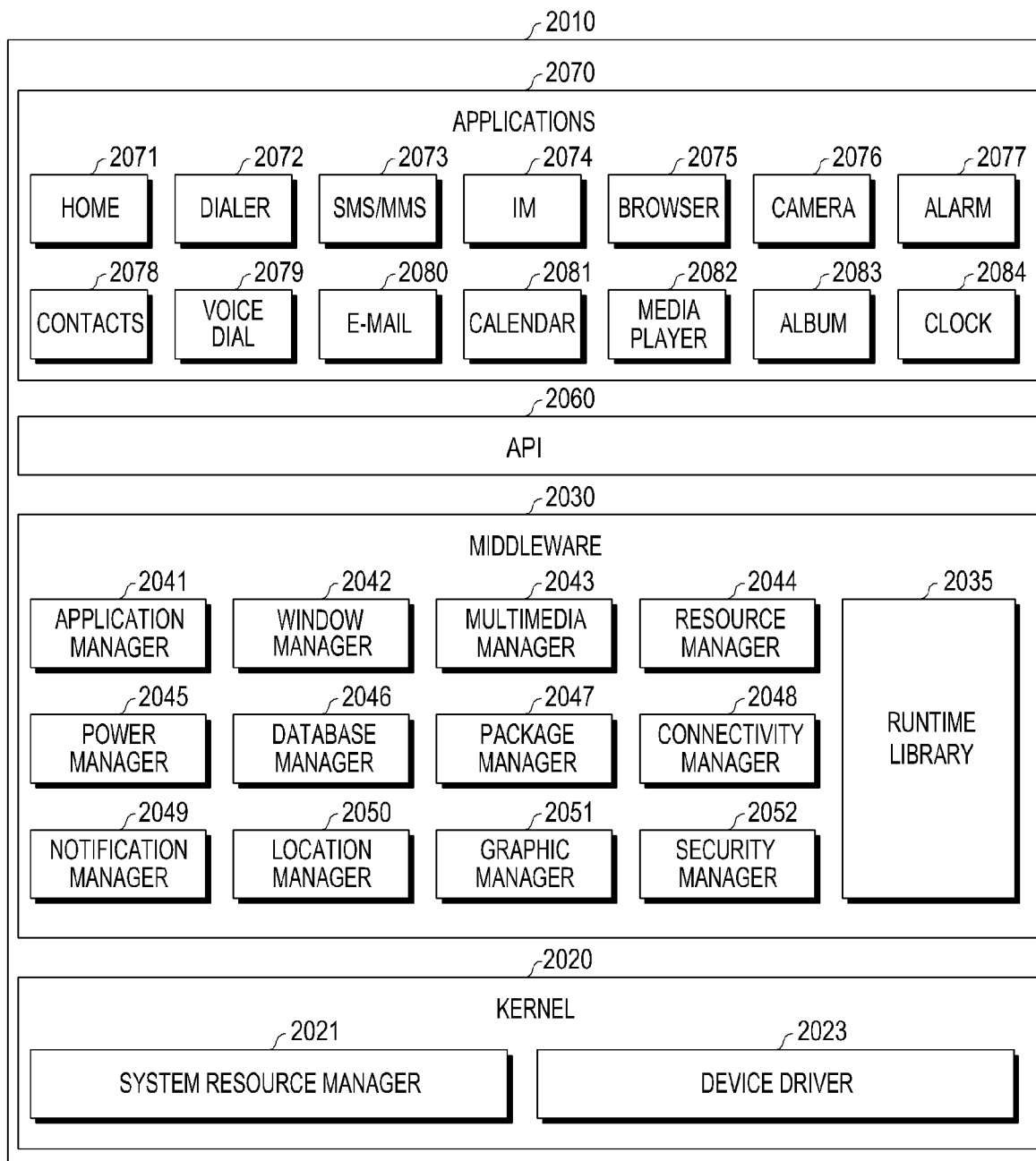
FIG. 20 illustrates a block diagram of a program module according to various embodiments.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination. FIG. 20 illustrates a block diagram of a program module according to various embodiments. According to an embodiment, the program module 2010 (for example, the program 140) may include an Operating System (OS) that controls resources relating to an electronic device (for example, the electronic device 101) and/or various applications (for example, the application programs 147) that are executed in the operating system. The operating system may be, for example, Android, iOS, Windows, Symbian, Tizen, Bada, and the like The program module 2010 may include a kernel 2020, middleware 2030, an Application Programming Interface (API) 2060, and/or applications 2070. At least a part of the program module 2010 may be preloaded on the electronic device, or may be downloaded from an external electronic device (for example, the electronic device 102 or 104 or the server 106).

The kernel 2020 (for example, the kernel 141 of FIG. 1 or the kernel 1511e of FIG. 15) may include, for example, a system resource manager 2021 and/or a device driver 2023. The system resource manager 2021 may control, allocate, or retrieve system resources. According to an embodiment, the system resource manager 2021 may include a process manager, a memory manager, or a file system manager. The device driver 2023 may include, for example, a display driver, a camera driver, a Bluetooth™ driver, a shared memory driver, a USB driver, a keypad driver, a Wi-Fi driver, an audio driver, or an Inter-Process Communication (IPC) driver.

The middleware 2030 may provide a function used by the applications 2070 in common or provide various functions to the applications 2070 through the API 2060 so that the applications 2070 can efficiently use limited system resources within the electronic device. According to an embodiment, the middleware 2030 (for example, the middleware 143) may include, for example, at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, and a security manager 2052.

The runtime library 2035 may include, for example, a library module that a compiler uses in order to add a new function through a programming language while the applications 2070 are being executed. The runtime library 2035 may perform input/output management, memory management, the functionality for an arithmetic function, and the like.

The application manager 2041 may manage, for example, the life cycle of at least one of the applications 2070. The window manager 2042 may manage Graphical User Interface (GUI) resources used on a screen. The multimedia manager 2043 may determine formats used to reproduce various media files and may encode or decode a media file using a coder/decoder (codec) appropriate for the corresponding format. The resource manager 2044 may manage resources, such as the source code, the memory, the storage space, and the like of at least one of the applications 2070.

The power manager 2045 may operate together with a Basic Input/Output System (BIOS) to manage a battery or power and may provide power information used for the operation of the electronic device. The database manager 2046 may generate, search for, and/or change a database to be used by at least one of the applications 2070. The package manager 2047 may manage the installation or update of an application that is distributed in the form of a package file.

The connectivity manager 2048 may manage a wireless connection, such as Wi-Fi, Bluetooth™, and the like. The notification manager 2049 may display or notify of an event, such as an arrival message, an appointment, a proximity notification, and the like, in such a manner that a user is not disturbed. The location manager 2050 may manage the location information of the electronic device. The graphic manager 2051 may manage a graphic effect to be provided to a user and a user interface relating to the graphic effect. The security manager 2052 may provide various security functions used for system security, user authentication, and the like. According to an embodiment, in a case where the electronic device (for example, the electronic device 101) has a telephone call function, the middleware 2030 may further include a telephony manager for managing a voice or video call function of the electronic device.

The middleware 2030 may include a middleware module that forms a combination of various functions of the above-described elements. The middleware 2030 may provide specialized modules according to the types of operating systems in order to provide differentiated functions. Furthermore, the middleware 2030 may dynamically remove some of the existing elements, or may add new elements.

The API 2060 (for example, the API 145) is, for example, a set of API programming functions, and may be provided with different configurations according to operating systems. For example, in the case of Android or iOS, one API set may be provided for each platform, and in the case of Tizen, two or more API sets may be provided for each platform.

The applications 2070 (for example, the application programs 147) may include one or more applications that can perform functions, for example, home 2071, dialer 2072, SMS/MMS 2073, Instant Message (IM) 2074, browser 2075, camera 2076, alarm 2077, contacts 2078, voice dial 2079, e-mail 2080, calendar 2081, media player 2082, album 2083, clock 2084, health care (for example, measuring exercise quantity or blood sugar), and environment information (for example, atmospheric pressure, humidity, temperature information, and the like).

According to an embodiment, the applications 2070 may include an application (hereinafter, referred to as an "information exchange application" for convenience of description) that supports information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of delivering, to the external electronic device (for example, the electronic device 102 or 104), notification information generated by other applications (for example, an SMS/MMS application, an email application, a health care application, an environmental information application, and the like) of the electronic device. Furthermore, the notification relay application may, for example, receive notification information from the external electronic device and may provide the received notification information to a user.

The device management application may manage (for example, install, delete, or update), for example, at least one function of an external electronic device (for example, the electronic device 102 or 104) that communicates with the electronic device (for example, a function of turning on/off the external electronic device itself (or some components thereof) or a function of adjusting the brightness (or resolution) of a display), applications that operate in the external electronic device, or services (for example, a call service, a message service, and the like) that are provided by the external electronic device.

According to an embodiment, the applications 2070 may include applications (for example, a health care application of a mobile medical appliance, and the like) that are specified according to attributes of an external electronic device (for example, the electronic device 102 or 104). According to an embodiment, the applications 2070 may include applications that are received from an external electronic device (for example, the server 106, or the electronic device 102 or 104). According to an embodiment, the applications 2070 may include preloaded applications or third-party applications that can be downloaded from a server. Names of the elements of the program module 2010, according to the above-described embodiments of the present disclosure, may change depending on the type of OS.

According to various embodiments of the present disclosure, at least some of the program module 2010 may be implemented in software, firmware, hardware, or a combination of two or more thereof. At least some of the program module 2010 may be implemented (for example, executed) by, for example, the processor (for example, the processor 1910). At least some of the program module 2010 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. According to various embodiments, a computer-readable recording medium having a program recorded therein to be executed on a computer is provided. The program may include instructions that, when executed by a processor, cause the processor to perform an operation of, when a cover is connected to the electronic device, an operation of determining generation of an event related to the cover; an operation of, when the event is generated, supplying power to the cover through wireless communication; an operation of, when the cover is driven by the supplied power, an operation of transmitting event information to the cover through the short range wireless communication to display the information related to the generated event on the cover; and an operation of, when an operation of the cover according to the event is completed, switching to a standby mode after releasing a short range wireless communication connection with the cover.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a battery;
   a first antenna;
   a second antenna;
   a short range wireless communication circuit; and
   a controller,
   wherein the controller is configured to control to:
   receive, through the first antenna, wireless power for wireless charging of the battery from an external electronic device,
   determine whether an event related to a cover is generated,
   based on determining that the event related to the cover is generated, control a strength of the wireless power for the wireless charging of the battery, and
   transmit, through the second antenna, information on the generated event to the cover for displaying the information on the generated event on the cover by using the short range wireless communication circuit connected with the cover, while receiving, through the first antenna, the wireless power of the controlled strength for the wireless charging of the battery.

2. The electronic device of claim 1, wherein the controller is further configured to:
   based on determining that the event related to the cover is generated, control the strength of the wireless power to be lower.

3. The electronic device of claim 1, wherein the controller is further configured to control to:
   based on determining that the event related to the cover is generated, deactivate a charging operation of receiving the wireless power for the wireless charging of the battery.

4. The electronic device of claim 1, wherein the controller is further configured to control to:
   supply power from the battery to the cover, and
   when the cover is driven by the supplied power from the battery, transmit the information on the generated event to the cover.

5. The electronic device of claim 1, wherein the controller is further configured to control to:
   determine whether another event is generated while the information on the generated event is transmitted to the cover, and
   based on determining that the other event is generated, keep transmitting the information on the generated event regardless of the generated other event.

6. The electronic device of claim 1, wherein the controller is configured to control to:
   calculate an operation time for the cover to complete displaying of the information on the generated event by analyzing the information on the generated event, and
   when the calculated operation time passes, determine that the cover completes displaying of the information on the generated event.

7. The electronic device of claim 1, wherein the controller is further configured to control to:
   when the electronic device releases a connection of the short range wireless communication circuit connected with the cover and another external electronic device is not recognized, continue supplying power to the cover for a preset standby time.

8. The electronic device of claim 1,
   wherein the cover is further configured to apply, to a display of the cover, power received from the electronic device.

9. A method for controlling an electronic device, comprising:
   receiving wireless power for wireless charging from an external electronic device;
   determining whether an event related to a cover is generated;

based on determining that the event related to the cover is generated, control a strength of the wireless power for the wireless charging of a battery; and transmitting information on the generated event to the cover for displaying the information on the generated event on the cover by using a short range wireless communication circuit of the electronic device connected with the cover, while receiving the wireless power of the controlled strength for the wireless charging of the battery.

10. The method of claim 9, wherein the controlling of the strength of the wireless power includes:

based on determining that the event related to the cover is generated, controlling the strength of the wireless power to be lower.

11. The method of claim 9, wherein the controlling of the strength of the wireless power includes:

based on determining that the event related to the cover is generated, deactivating a charging operation of receiving the wireless power for the wireless charging of the battery.

12. The method of claim 9, further comprising:

supplying power to the cover; and when the cover is driven by the supplied power, transmitting the information on the generated event to the cover.

13. The method of claim 9, wherein the transmitting of the information on the generated event to the cover further comprising:

determining whether another event is generated while the information on the generated event is transmitted to the cover; and based on determining that the other event is generated, keeping transmitting the information on the generated event regardless of the generated other event.

14. The method of claim 9, further comprising:

calculating an operation time for the cover to complete displaying of the information on the generated event by analyzing the information on the generated event; and when the calculated operation time passes, determining that the cover completes displaying of the information on the generated event.

15. The method of claim 9, comprising:

when the electronic device releases a connection of the short range wireless communication circuit connected with the cover and another external electronic device is not recognized, continuing to supply the power to the cover for a preset standby time.

* * * * *